(12) United States Patent
Tamura

(10) Patent No.: US 7,476,072 B2
(45) Date of Patent: Jan. 13, 2009

(54) TRANSPORT APPARATUS

(75) Inventor: Shuji Tamura, Chiba (JP)

(73) Assignee: Line Works Co., Ltd., Chiba-shi (JP)

( * ) Notice: Subject to any disclaimer, the term of this patent is extended or adjusted under 35 U.S.C. 154(b) by 796 days.

(21) Appl. No.: 10/985,892

(22) Filed: Nov. 12, 2004

(65) Prior Publication Data

US 2005/0196263 A1    Sep. 8, 2005

(30) Foreign Application Priority Data

Mar. 4, 2004    (JP)    ............... 2004-061041

(51) Int. Cl.
   *B65G 1/133*    (2006.01)

(52) U.S. Cl. .................. 414/749.1; 269/55; 269/58; 901/16

(58) Field of Classification Search .............. 414/744.5, 414/799, 560, 589, 590, 682, 901, 749.1; 901/29, 27, 16, 41, 42, 44; 269/55, 58
See application file for complete search history.

(56) References Cited

U.S. PATENT DOCUMENTS

| | | | | |
|---|---|---|---|---|
| 4,705,447 A | * | 11/1987 | Smith | 414/590 |
| 4,852,237 A | * | 8/1989 | Tradt et al. | 29/407.05 |
| 4,978,274 A | * | 12/1990 | de Groot | 414/744.3 |
| 5,042,287 A | * | 8/1991 | Sartorio | 72/422 |
| 5,149,029 A | * | 9/1992 | Smith | 248/124.2 |
| 5,151,570 A | * | 9/1992 | Sakurai | 219/86.25 |
| 5,311,659 A | * | 5/1994 | Barnhart et al. | 29/823 |
| 5,605,432 A | * | 2/1997 | Fink et al. | 414/752.1 |
| 5,606,235 A | * | 2/1997 | Mauletti | 318/625 |
| 5,606,262 A | * | 2/1997 | Montalbano et al. | 324/758 |
| 5,672,044 A | * | 9/1997 | Lemelson | 414/744.3 |
| 5,681,138 A | * | 10/1997 | Lust et al. | 414/752.1 |
| 5,760,560 A | * | 6/1998 | Ohya et al. | 318/568.1 |
| 6,212,968 B1 | * | 4/2001 | Hiruma et al. | 74/490.03 |
| 6,339,204 B1 | * | 1/2002 | Kato et al. | 219/86.7 |
| 6,430,796 B1 | * | 8/2002 | Jones et al. | 29/243.53 |
| 6,718,229 B1 | * | 4/2004 | Takebayashi et al. | 700/217 |
| 6,766,996 B1 | * | 7/2004 | Somers | 248/650 |

FOREIGN PATENT DOCUMENTS

| | | |
|---|---|---|
| JP | A 57-32896 | 2/1982 |
| JP | A 8-10948 | 1/1996 |
| JP | B2 3026790 | 1/2000 |
| JP | A 2003-117692 | 4/2003 |

* cited by examiner

*Primary Examiner*—Saúl J Rodriguez
*Assistant Examiner*—John-Paul N Mitchell
(74) *Attorney, Agent, or Firm*—Oliff & Berridge, PLC

(57) ABSTRACT

A transport apparatus includes a table capable of making a lateral reciprocating movement; a column arranged upright on the table so as to be capable of making normal and reverse rotation; an arm protruding sidewise from the column, the arm being capable of making a lateral reciprocating movement and ascending and descending along the column; a head mounted to the tip of the arm so as to be capable of making normal and reverse rotation; and a jig mounting stage mounted to the head so as to be capable of making normal and reverse rotation, thus allowing six-axis movements. A welding robot or a workpiece can be carried on the jig mounting stage and transported while being grasped, and the six-axis movements can be stopped at desired positions, making it possible to perform positioning on the welding robot or the workpiece in terms of orientation, height, etc.

11 Claims, 21 Drawing Sheets

TRANSPORT APPARATUS

BACKGROUND OF THE INVENTION

1. Field of the Invention

The present invention relates to a transport apparatus capable, for example, of holding or bearing a heavy object, in particular, a heavy article weighing 1 ton or more, such as a heavy load, product, or workpiece (hereinafter referred to as an "article"), setting it at a predetermined position (i.e., setting it in position), or bearing a robot.

2. Related Background Art

A transport apparatus (a handling robot or a material handling apparatus) has been available which, for example, moves an article within a plant, loads and unloads an article on and from a truck, or transfers an article transported by a conveyor onto another conveyor. Conventional examples of such a transport apparatus include an articulated six-axis robot and the transport apparatus by the present applicant (JP 3077753 B).

A positioning apparatus (a positioner) for setting an article at the operating position (i.e., setting it in position) for a welding robot, a coating robot, or the like has also been available. An example of the positioner is the positioning apparatus by the present applicant (JP 3026790 B).

While it is of an articulated six-axis type, a conventional handling robot has a main body that is stationary, which means it is incapable of moving longitudinally or laterally; its arm, which rotates, has its limitations in rotation range. Further, while the robot arm is capable of vertical rotation, the robot main body does not extend upwardly, so that there are limitations regarding the upward movable range. Thus, the conventional handling robot is generally restricted in its movable range.

In a conventional articulated six-arm robot, its arm is directly mounted to a reduction gear constituting the drive source thereof, so that the load on the arm is directly applied to the reduction gear, which means the reduction gear has to bear the burden, so that this robot is not suitable for the transport of a heavy object, in particular, an object weighing as much as 1 ton or more. The maximum weight that can be borne by the robots on the market is 750 kg.

While free from any particular problems, the transport apparatus of JP 3077753 B and the positioning apparatus of JP 3026790 B have been respectively developed mainly for the purposes of the transport of an article and the positioning of an article, which means neither of them is suited for conducting both transport and positioning alone.

SUMMARY OF THE INVENTION

The present invention provides a transport apparatus which can transport a heavy object weighing 1 ton or more, which has a wider movable range than the conventional handling robots, which can also be used as a positioner capable of high accuracy positioning, and which can carry robots for various uses, such as welding and coating, and perform such operations. This transport apparatus is applicable to various fields, such as the manufacturing industry for the production of vehicles including automobiles, electrical apparatuses, construction equipment, machine tools, etc., the distributing industry, and the transportation trade.

The transport apparatus of the present invention includes: a table provided on a rail; a column vertically provided on the table; an arm laterally mounted to the column and protruding sidewise therefrom; a head mounted to a tip of the arm and protruding sidewise therefrom; and a jig mounting stage mounted to the head, in which the table can make a reciprocating movement along the rail, the column is capable of making normal and reverse rotation on the table, the arm is capable of ascending and descending along the column and making a lateral reciprocating movement, the head is capable of making normal and reverse rotation around an axis thereof, and the jig mounting stage is capable of making normal and reverse rotation around an axis thereof, and in which the reciprocating movement of the table, the ascending and descending and the lateral reciprocating movement of the arm, the normal and reverse rotation of the column, the normal and reverse rotation of the head, and the normal and reverse rotation of the jig mounting stage can be stopped at desired positions.

The table is enabled to reciprocate on the rail by a table movement mechanism and a table movement drive source for driving the same; the column is enabled to make normal and reverse rotation on the table by a column rotation mechanism and a column rotation mechanism drive source for driving the same; the arm is enabled to ascend and descend along the column by an ascent/descent mechanism and an ascent/descent mechanism drive source for driving the same and is enabled to reciprocate in the lateral direction of the column by a lateral movement mechanism and a lateral movement mechanism drive source for driving the same; the head is enabled to make normal and reverse rotation around the head axis by a head rotation mechanism and a head rotation mechanism drive source for driving the same; and the jig mounting stage is enabled to make normal and reverse rotation around the axis thereof by a jig mounting stage rotation mechanism and a jig mounting stage rotation mechanism drive source for driving the same.

Further, in the present invention, revolving wheel bearings are used in the column rotation mechanism, the head rotation mechanism, and the jig mounting stage rotation mechanism, and motors and reduction gears are used in the column rotation mechanism drive source, the head rotation mechanism drive source, and the jig mounting stage rotation mechanism drive source for driving the revolving wheel bearings. In this case, the head rotation mechanism drive source and the jig mounting stage rotation mechanism drive source are arranged at the rear of the revolving wheel bearings so as to be offset rearwards and sidewise with respect to the respective revolving wheel bearings, whereby it is possible to secure at the rear of the revolving wheel bearings a space that can be used for wiring, piping, etc. Further, the vertical axis of the column and the vertical axis of the head are arranged in the same line parallel to the axis of the arm, thereby improving the transport apparatus in terms of balance. Further, the rail is formed in modules, allowing addition and removal, whereby the rail can be extended or shortened.

BRIEF DESCRIPTION OF THE DRAWINGS

In the accompanying drawings:

FIG. 7B is a front view of the portion shown in FIG. 7A;

DESCRIPTION OF THE PREFERRED EMBODIMENTS

Embodiment 1

Figure 1:
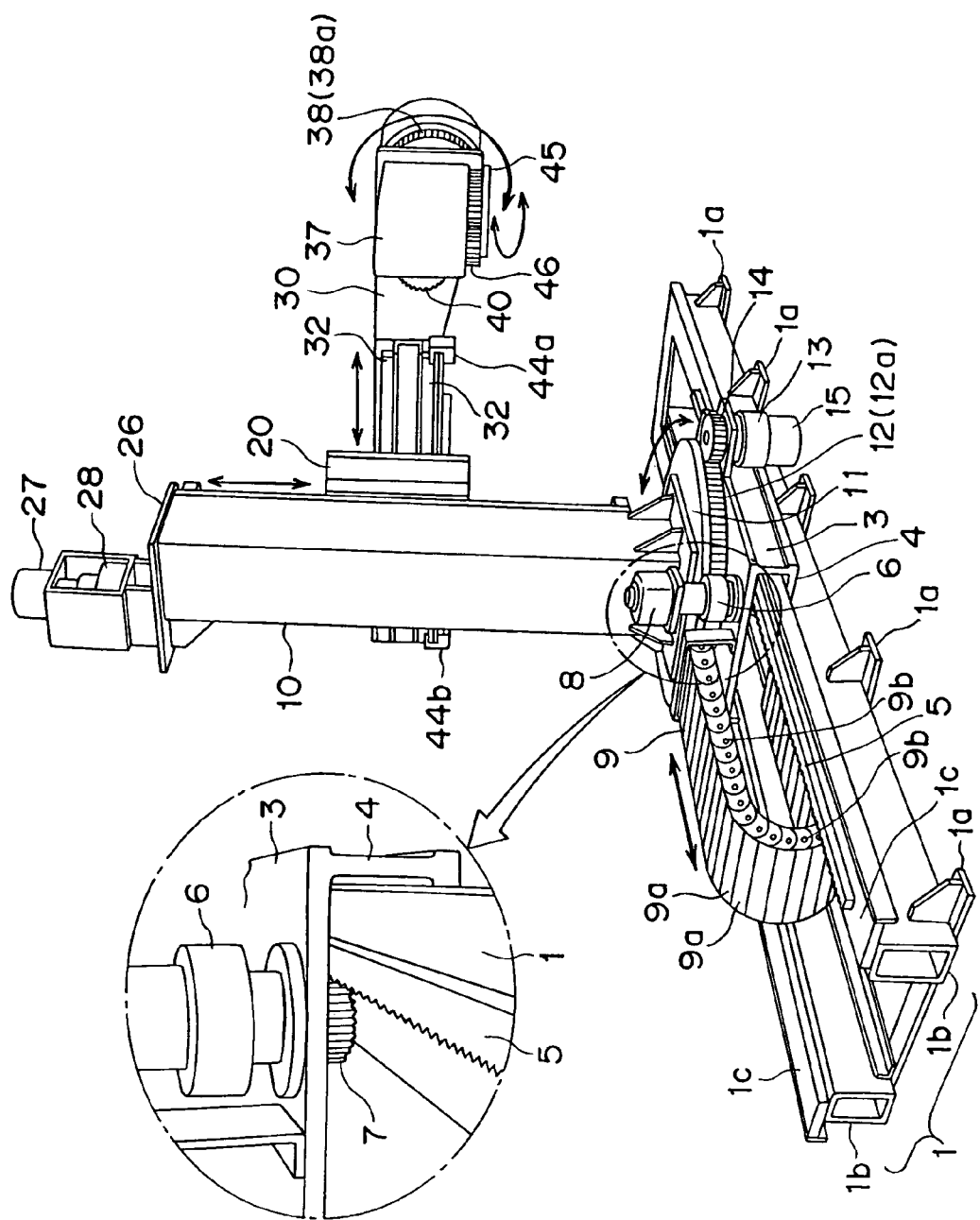
FIG. 1 is a perspective view, as seen from the back side, of an embodiment of the transport apparatus of the present invention.
Figure 2:
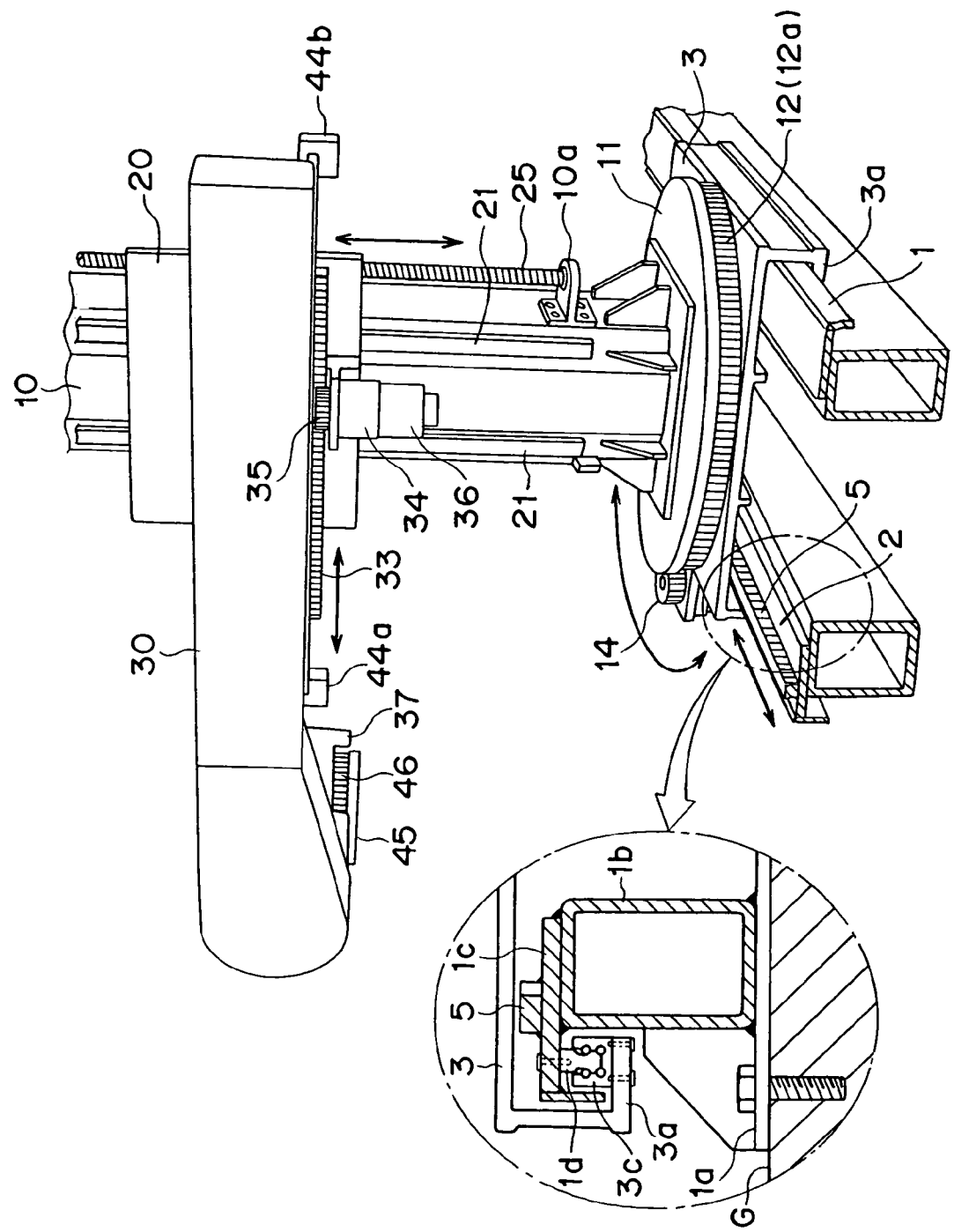
FIG. 2 is a perspective view, as seen from the front side, of the embodiment of the transport apparatus of the present invention.

An embodiment of the transport apparatus of the present invention will be described with reference to the drawings. As shown in FIG. 1, in this transport apparatus, a table 3 is arranged so as to be capable of reciprocating on a rail 1. As shown in FIG. 2, the rail 1 includes support legs 1a to the upper sides of which support stands 1b are fixed by a fixing means, such as welding, and rail support members 1c are fixed to the upper sides of the support stands 1b so as to protrude sidewise, with linear guide rails 1d being fixed to the lower sides of the rail support members 1c by fixing means, such as bolts. As shown in FIG. 2, the outer side end portions of the table 3 are bent downwardly into a U-shape to form bearing support portions 3a, and linear guide bearings 3c are fixed to the upper side of the bearing support portions 3a by a fixing means, such as bolts. Through fit-engagement of the linear guide bearings 3c and the linear guide rails 1d, the table 3 can reciprocate along the linear guide rails 1d. The support legs 1a of the rail 1 are fixed to the floor G, etc. of a plant, a workshop or the like.

As shown in FIG. 1, a thin and narrow rack 5 is fixed to the upper surface of the rail 1, and a pinion 7 of a reduction gear 6 mounted to the inner side of the table 3 is held in mesh therewith; when the pinion 7 of the reduction gear 6 is rotated by a servo motor 8, the pinion 7 moves laterally along the rack 5, and, when the pinion 7 is rotated in the reverse direction, the pinion 7 is moved in the opposite direction (i.e., returned), whereby the linear guide bearings 3c of the table 3 reciprocate along the linear guide rails 1d of the rail 1, thus allowing the table 3 to reciprocate along the rail 1. In the case of the example shown in FIG. 1, wiring, such as cables are accommodated in a cable wiring member (e.g., Cable Bear (registered trademark)) 9 so that the cables, etc. may not get entangled when the table 3 moves. The cable wiring member 9 includes a multitude of connection pieces 9a connected by connecting pins 9b so as to allow bending, and can move with the movement of the table 3 while bending in the moving direction of the table 3.

An upright column 10 is provided on the table 3. As shown in FIG. 2, mounted to the lower portion of the column 10 is a rotation plate 11, which is mounted onto a revolving wheel bearing 12, whose gear 12a is held in mesh with a pinion 14 of a reduction gear 13 mounted to a side of the table 3 as shown in FIG. 1; when the pinion 14 of the reduction gear 13 is rotated by a motor 15, the gear 12a of the revolving wheel bearing 12 rotates, and the rotation plate 11 rotates therewith, causing the column 10 thereon to rotate. When the motor 15 is rotated in the reverse direction, the pinion 14 of the reduction gear 13, the gear 12a of the revolving wheel bearing 12, and the rotation plate 11 are rotated in the reverse direction, and the column 10 thereon rotates in the reverse direction.

Figures 3A, 3B:
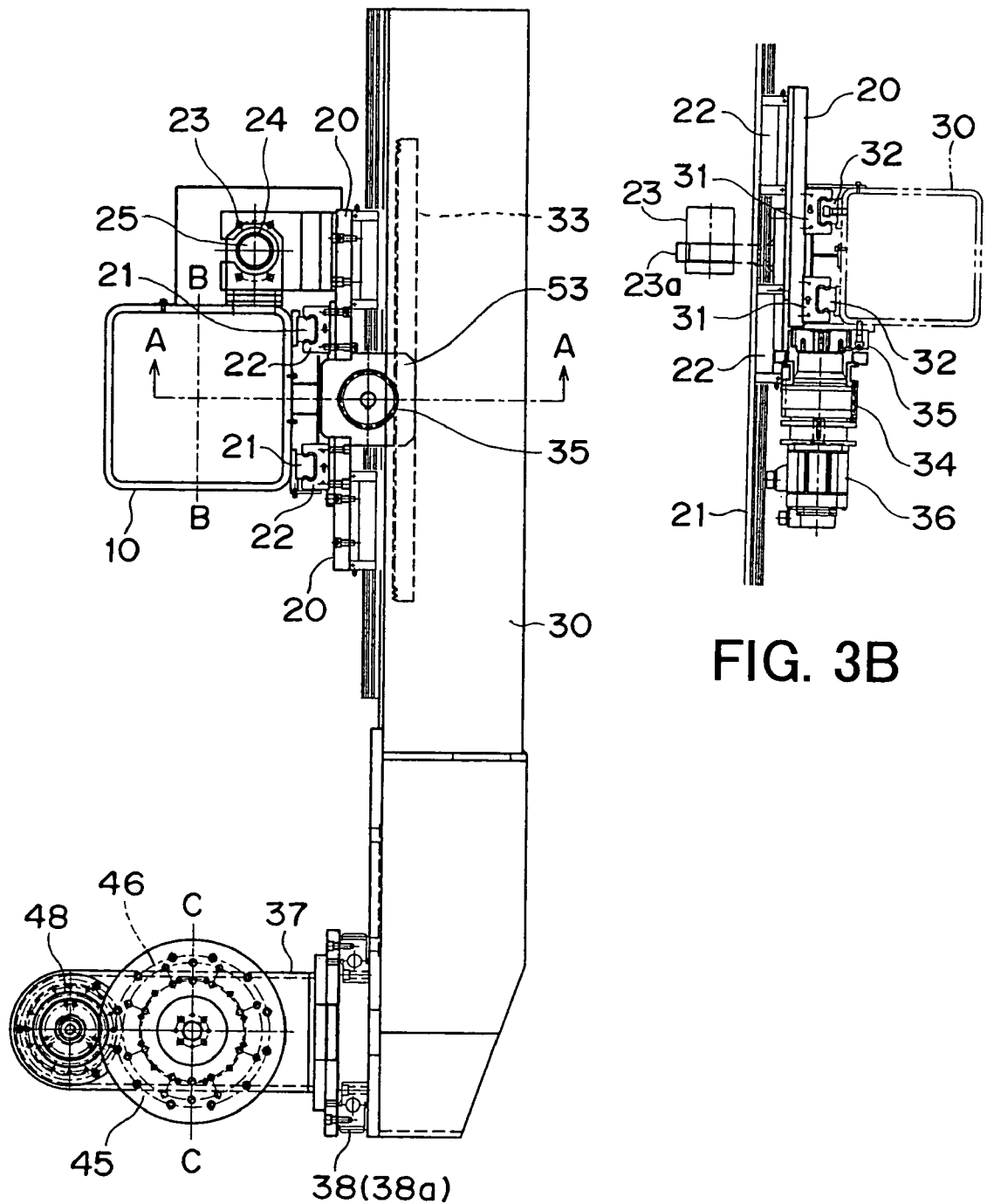
FIG. 3A is a plan view of the embodiment of the transport apparatus of the present invention.
FIG. 3B is a sectional view taken along the line A-A of FIG. 3A.
Figure 4:
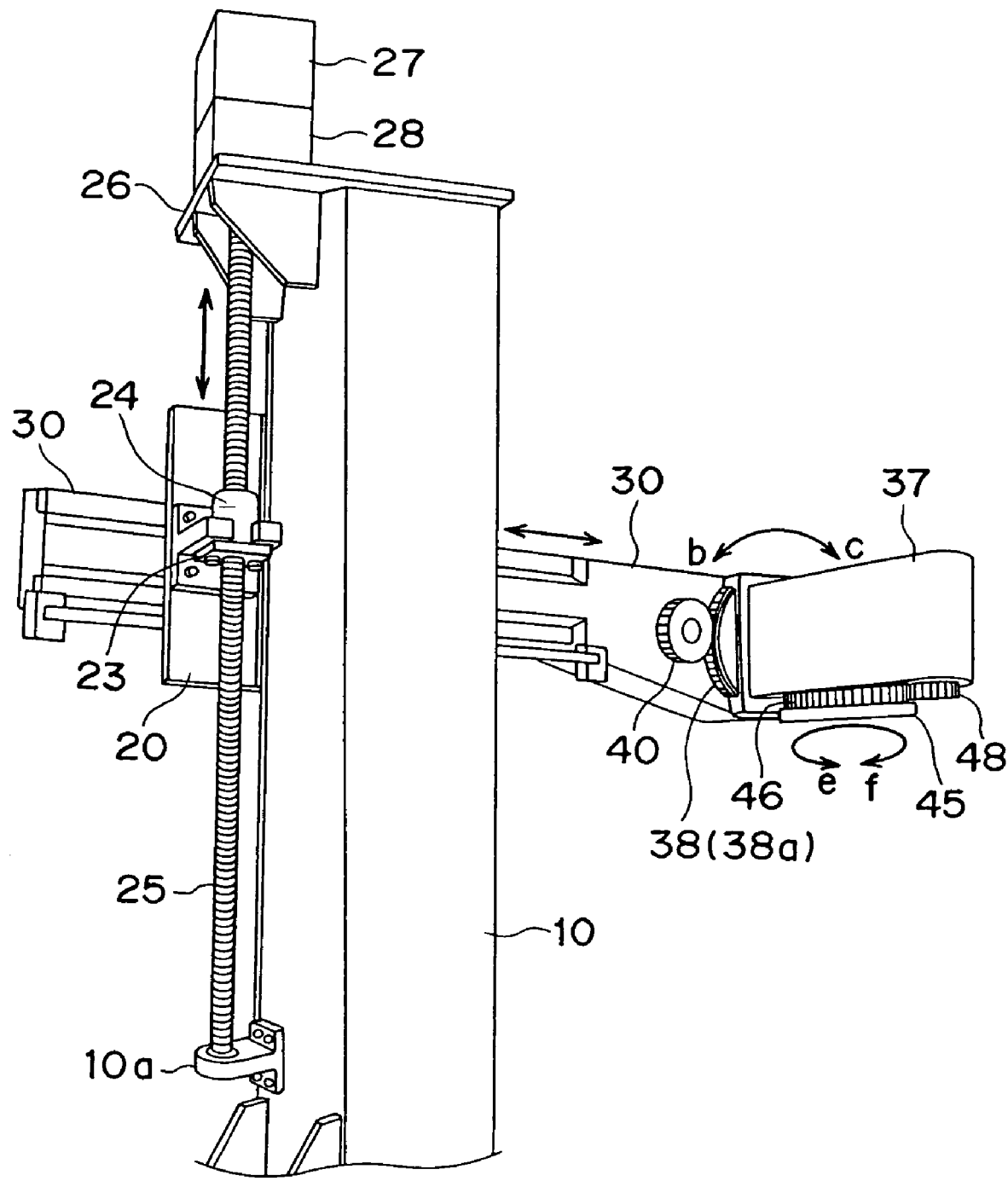
FIG. 4 is a perspective view, as seen from below, of the embodiment of the transport apparatus of the present invention.
Figure 5:
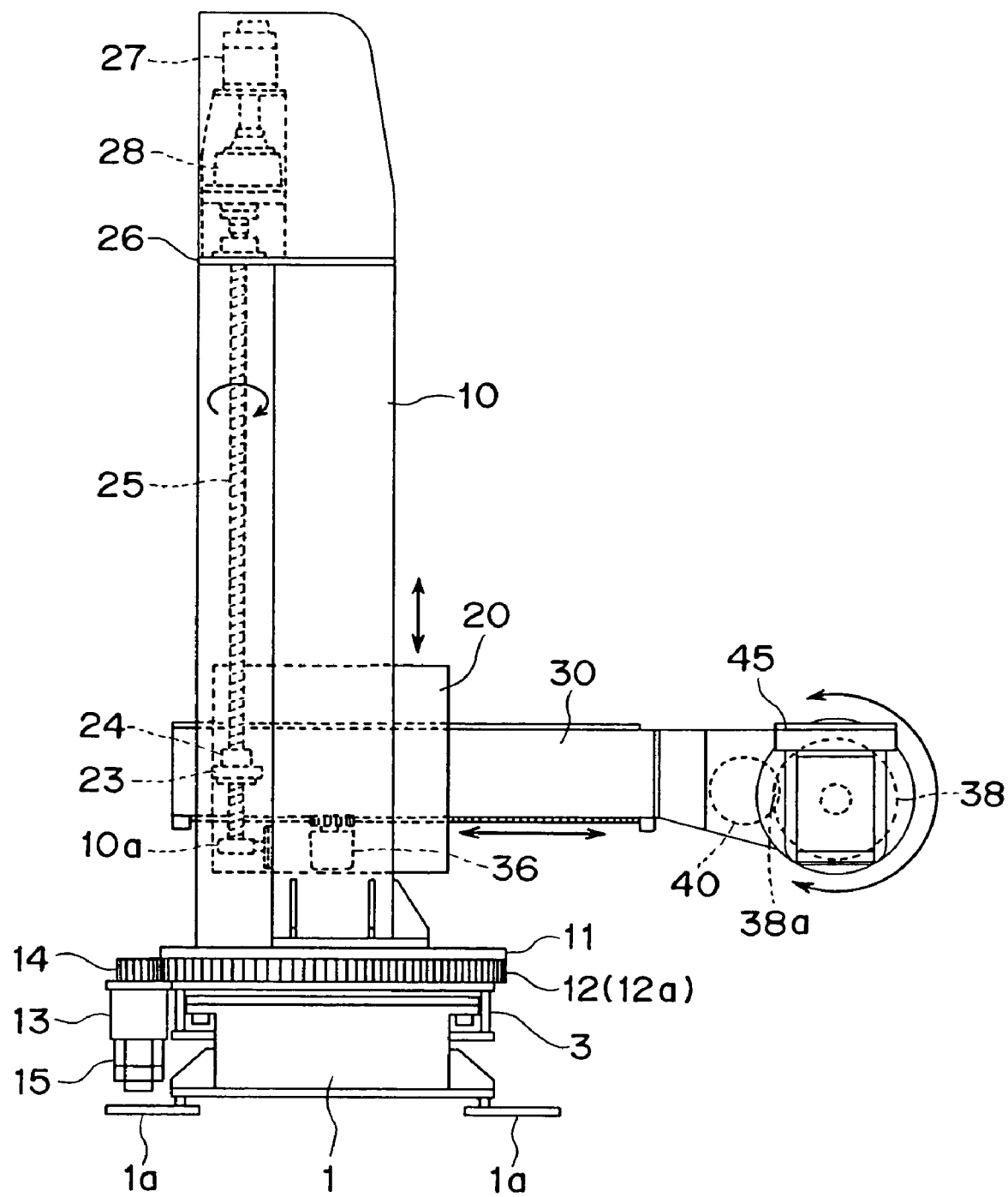
FIG. 5 is a rear view of the embodiment of the transport apparatus of the present invention.

A thick-plate-like ascent/descent member 20 is mounted to the column 10 so as to be capable of ascending and descending, and, as shown in FIGS. 2 and 3A, two linear guide rails 21 laterally spaced apart from each other are mounted to the front surface of the column 10 so as to extend vertically and parallel to each other; the linear guide rails 21 are brought into fit-engagement with linear guide bearings 22 formed on the back surface of the ascent/descent member 20, thereby enabling the ascent/descent member 20 to ascend and descend along the linear guide rails (along the column 10). Further, as shown in FIGS. 3A and 4, a ball screw nut 24 is mounted to a bracket 23 provided on the back surface of the ascent/descent member 20, and a ball screw 25 is screwed into the ball screw nut 24; when the ball screw 25 is rotated, the ball screw nut 24 and the bracket 23 ascend, and with this ascent, the ascent/descent member 20 ascends, and, when the ball screw 25 is rotated in the reverse direction, the ball screw nut 24 and the bracket 23 descend, and the ascent/descent member 20 descends. As shown in FIG. 4, the ball screw 25 is supported by a ball screw support member 10a on a side surface of the column 10 and a top plate 26 at the upper end of the column 10, and is adapted to be rotated when a motor 27 installed on the top plate 26 is rotated to rotate a reduction gear 28.

A laterally elongated arm 30 is laterally mounted to the ascent/descent member 20 so as to cross the column 10, and the arm 30 can reciprocate in the longitudinal direction thereof (laterally). For the reciprocating movement, as shown in FIG. 3B, groove-like linear guide bearings 31, vertically spaced apart from each other, are provided on the front surface of the ascent/descent member 20 so as to extend laterally and parallel to each other, and linear guide rails 32, vertically spaced apart from each other and mounted to the back surface of the arm 30 so as to extend laterally and parallel to each other, are brought into fit-engagement with the linear guide bearings 31; further, as shown in FIG. 2, a thin and narrow rack 33 is mounted to the bottom surface of the arm 30 so as to extend in the longitudinal direction of the arm 30, and a pinion 35 of a reduction gear 34 (FIG. 3B) mounted to the ascent/descent member 20 is brought into mesh with the rack 33; when a servo motor 36 is rotated to rotate the pinion 35 of the reduction gear 34, the rack 33 moves laterally along the linear guide bearings 31 (so as to cross the column 10), and, at the same time, the arm 30 moves in the same direction. When the servo motor 36 is rotated in the reverse direction, the pinion 35 of the reduction gear 34 (FIG. 3B) rotates in the reverse direction, and the rack 33 is returned in the opposite direction, with the arm 30 returning so as to cross the column 10, thus performing the reciprocating movement. In FIG. 3A, reference numeral 53 indicates a reduction gear mounting member.

Figure 6:
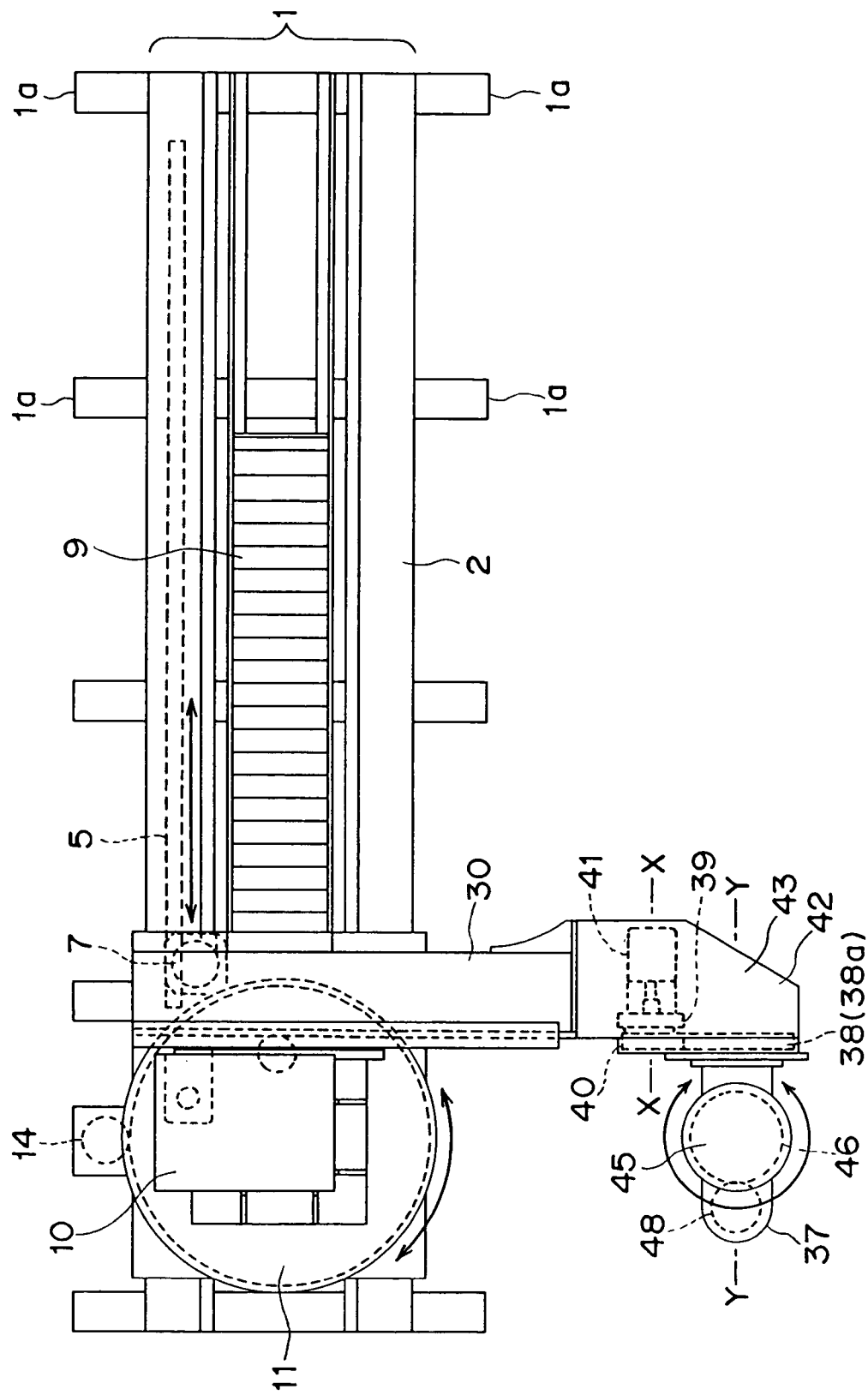
FIG. 6 is a plan view of the embodiment of the transport apparatus of the present invention.
Figure 7A:
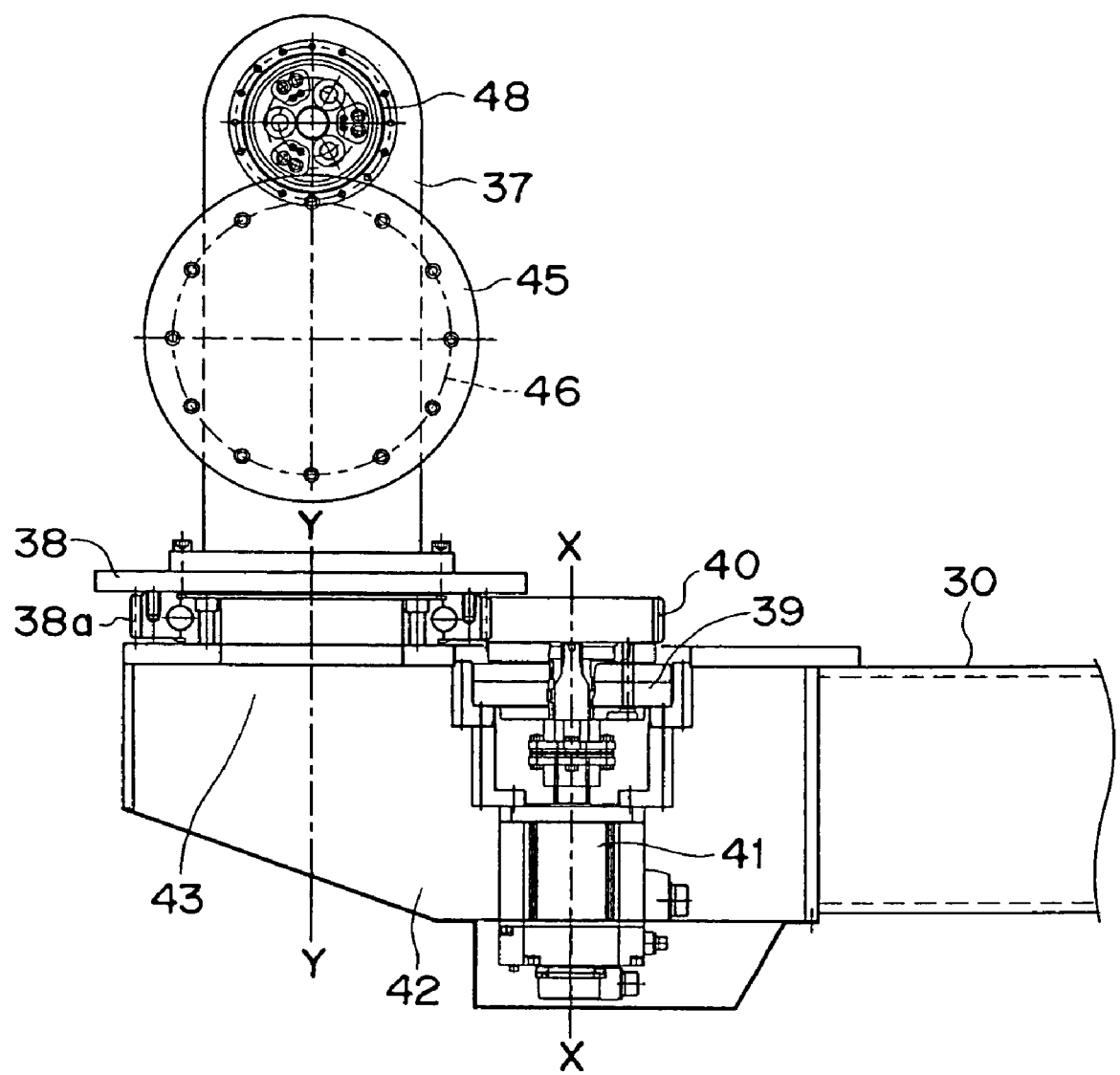
FIG. 7A is a plan view of a portion around a head, a jig mounting member and an arm in the transport apparatus according to the present invention.

As shown in FIG. 4, a head 37 is mounted to a forward end portion of the arm 30 so as to perpendicularly protrude on the column 10 side. As shown in FIG. 6, a revolving wheel bearing 38 is used for the mounting of the head 37; a gear 38a of the revolving wheel bearing 38 is brought into mesh with a pinion 40 of a reduction gear 39; when a servo motor 41 is rotated to rotate the pinion 40 of the reduction gear 39, the revolving wheel bearing 38 rotates, and the head 37 rotates in the direction of the arrow b in FIG. 4; and when the motor 41 of FIG. 6 is rotated in the reverse direction, the pinion 40 of the reduction gear 39 is rotated in the reverse direction, and the head 37 rotates in the reverse direction as indicated by the arrow c. The servo motor 41 and the reduction gear 39 are accommodated in a hollow accommodating portion 42 (FIGS. 6 and 7A) formed at the forward end of the arm 30. In this case, as shown in FIGS. 6 and 7A, the center axis X-X of the motor 41 and the reduction gear 39 is offset sidewise with respect to the center axis Y-Y of the revolving wheel bearing 38, securing a space 43 that can be used for wiring, piping, etc. at the rear of the revolving wheel bearing 38 in the accommodating portion 42 (by the side of the motor 41 and the reduction gear 39). This space 43 is large enough to allow mounting of a Center Hole Joint (the trade name for a wiring/piping jig by the present applicant) which is a combination of a hydraulic rotary joint and a slip ring.

Figure 8A:
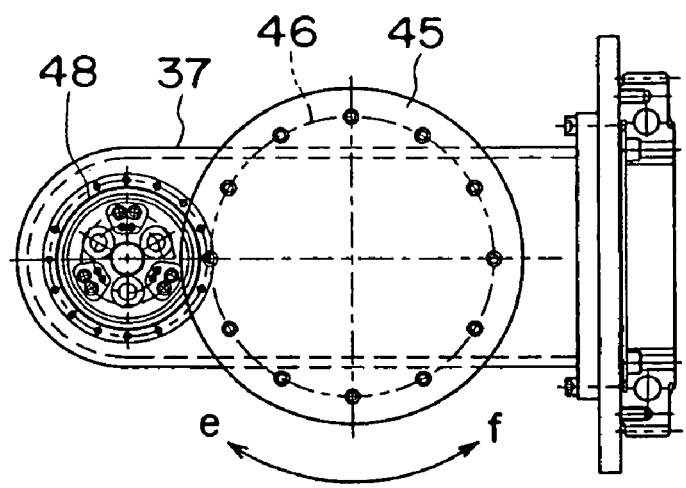
FIG. 8A is a plan view of the portion around the head and the jig mounting member in the transport apparatus according to the present invention.
Figure 8B:
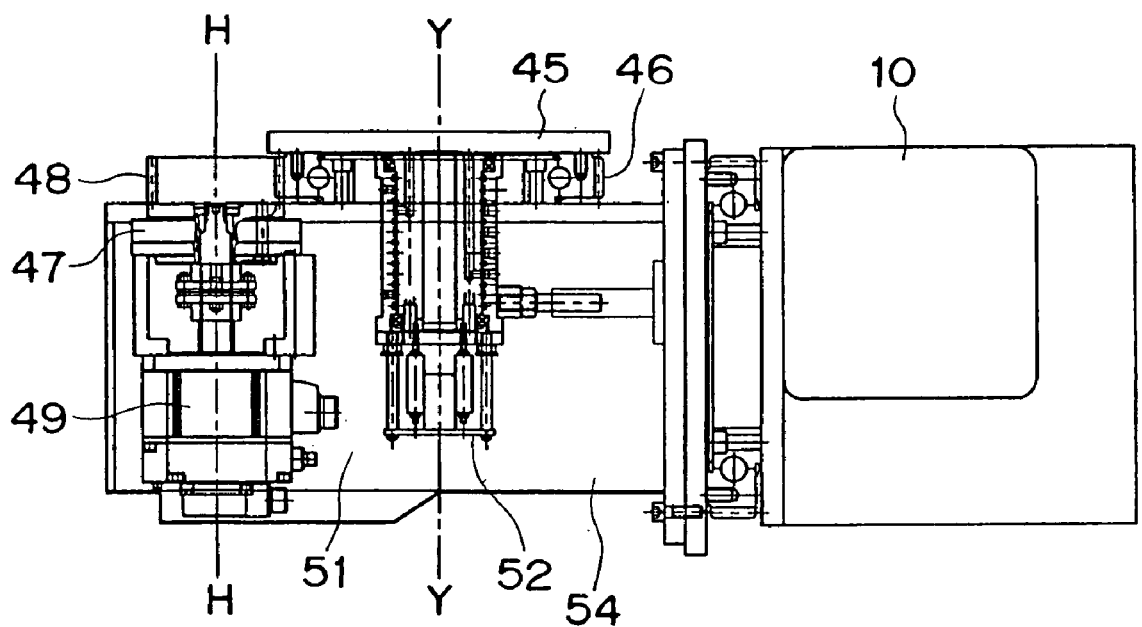
FIG. 8B is a front view of the portion shown in FIG. 8A.

As shown in FIG. 4, a disc-like jig mounting stage 45 is mounted to the head 37 so as to be capable of rotating in the direction of the arrow e. A revolving wheel bearing 46 (FIGS. 8A and 8B) is mounted to the rotation mechanism of the jig mounting stage 45 so as to be perpendicular to the axis of the head 37, and is capable of horizontally making normal and reverse rotation (in the directions of the arrows e and f in FIG. 8A). As shown in FIGS. 8A and 8B, for the normal and reverse rotation, a pinion 48 of a reduction gear 47 is brought into mesh with the gear of the revolving wheel bearing 46; when the pinion 48 of the reduction gear 47 is rotated by a servo motor 49 (FIG. 8B), the revolving wheel bearing 46 rotates, and the jig mounting stage 45 rotates in the direction of the arrow e of FIG. 8A; and when the pinion 48 of the reduction gear 47 is rotated in the reverse direction by the servo motor 49, the revolving wheel bearing 46 makes reverse rotation in the direction of the arrow f, and the jig mounting stage 45 rotates in the same direction. As shown in FIG. 8B, the head 37 is formed as a hollow case including an accommodating space 54, which accommodates the motor 49 and the reduction gear 47. In this case, as shown in FIG. 8B, the center axis H-H of the motor 49 and the reduction gear 47 is offset sidewise and rearwards with respect to the center axis Y-Y of the revolving wheel bearing 46, thereby securing a space 51 large enough to allow wiring, piping, etc. at the rear of the revolving wheel bearing 46 in the accommodating space 54 (by the side of the motor 49 and the reduction gear 47). This space 51 is also large enough to allow mounting of a center hole joint 52 that is a combination of a hydraulic rotary joint and a slip ring.

Further, as shown in FIG. 3A, the center axis C-C of the jig mounting stage 45 and the center axis B-B of the column 10 are arranged in the same line so that, even when the arm 30 moves horizontally or vertically, the above relationship of being in the same line is secured, thereby stabilizing the transport apparatus as a whole. Symbols 44a and 44b in FIG. 2 indicate stoppers for preventing excessive lateral movement of the arm 30.

(Operations of the Transport Apparatus of the Present Invention)

Figure 9:
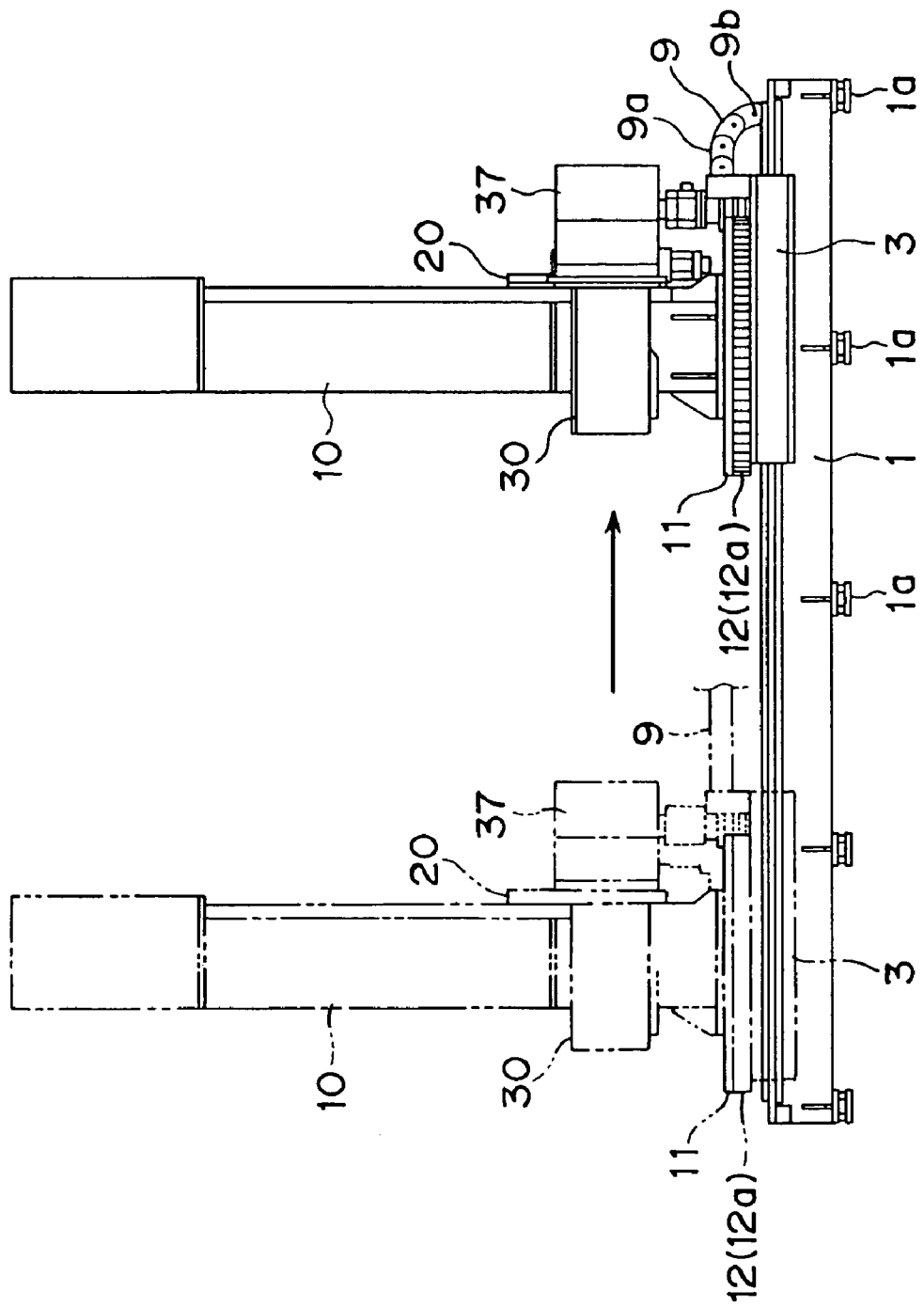
FIG. 9 is an explanatory view illustrating how the column of the transport apparatus according to the present invention is moved.
Figure 10:
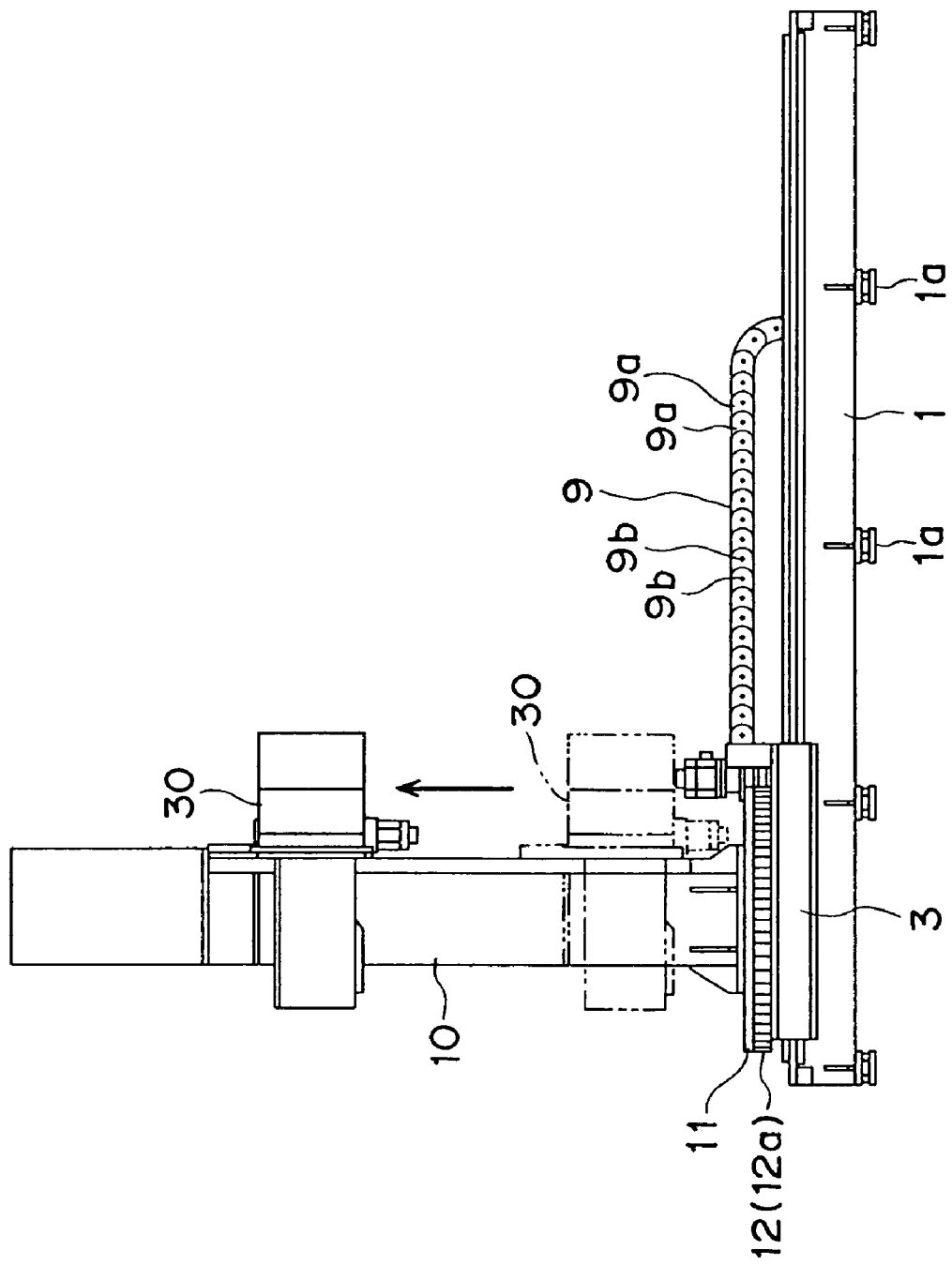
FIG. 10 is an explanatory view illustrating how the arm of the transport apparatus according to the present invention is raised and lowered.
Figure 11:
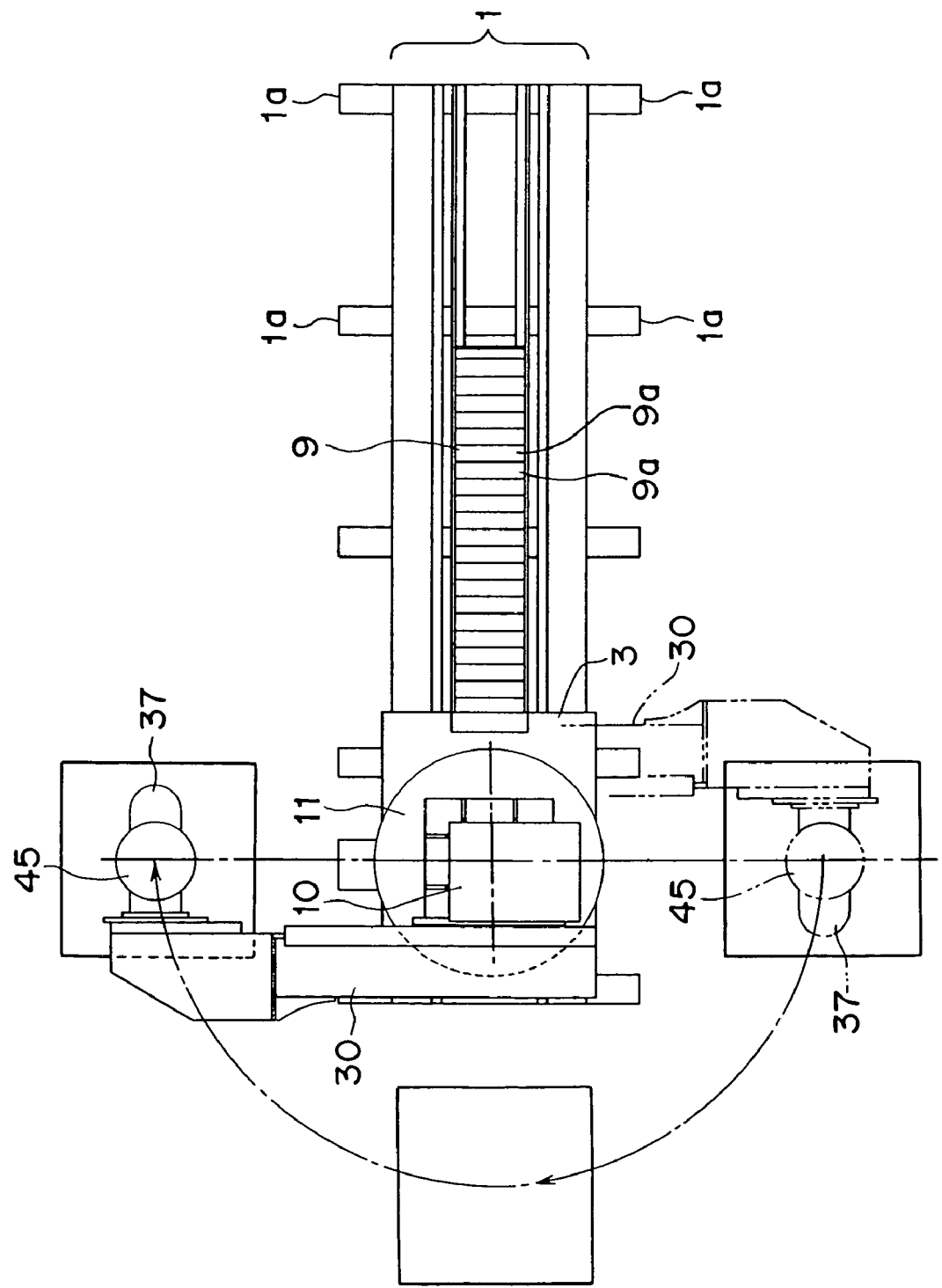
FIG. 11 is an explanatory view illustrating the operation when rotating the column of the transport apparatus according to the present invention.
Figure 13:
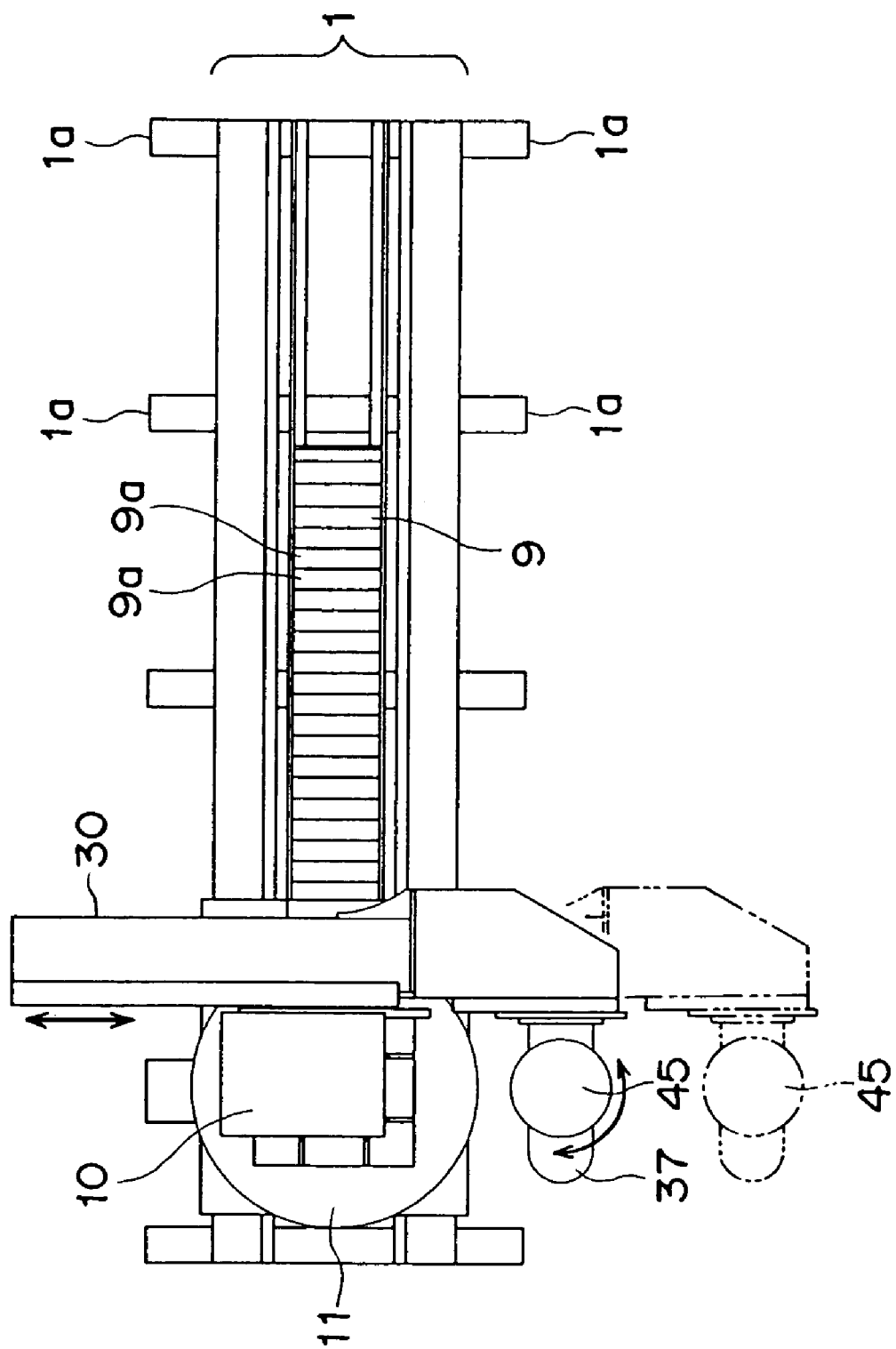
FIG. 13 is an explanatory view illustrating how the arm of the transport apparatus according to the present invention is laterally moved.
Figure 14:
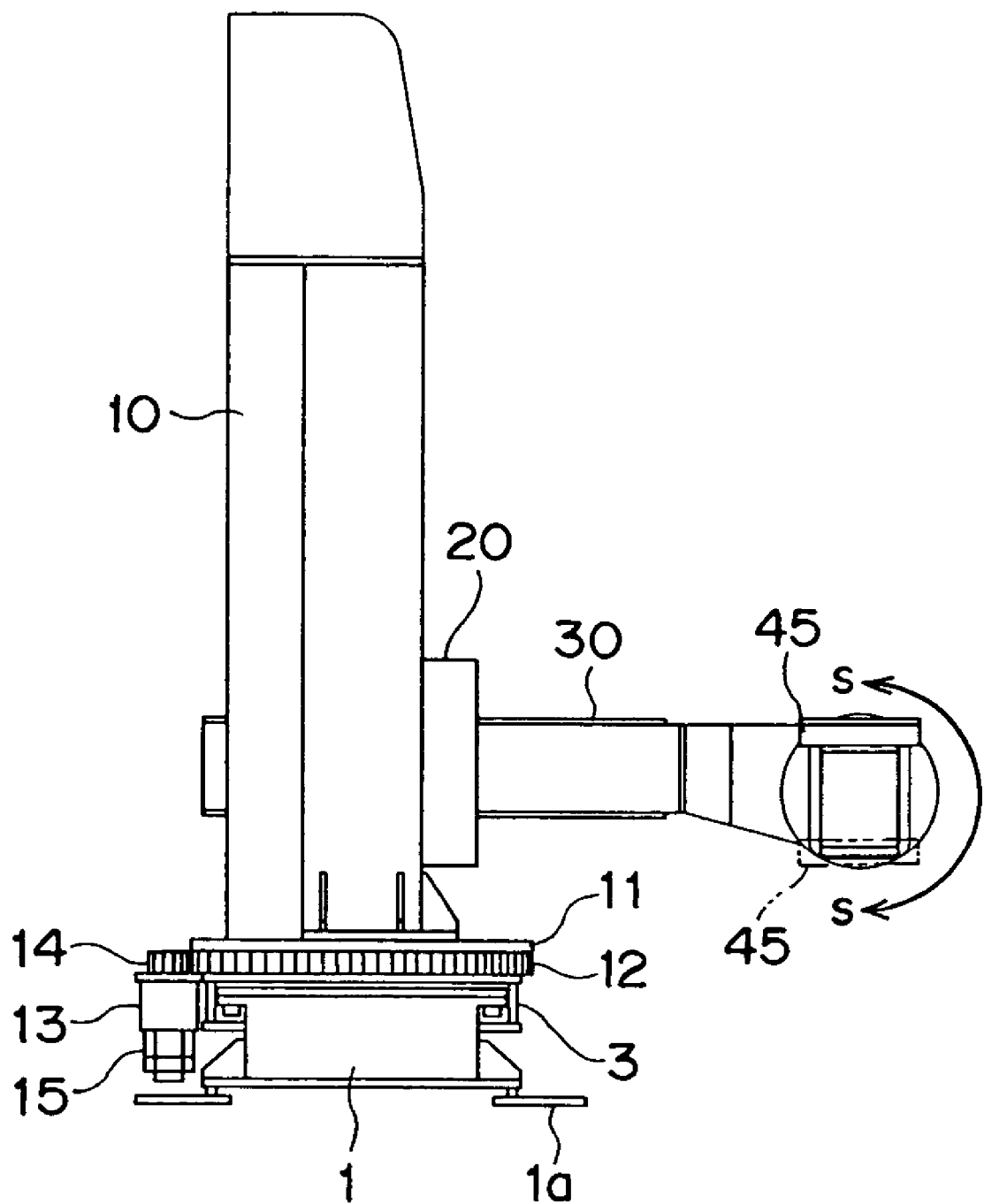
FIG. 14 is an explanatory view illustrating how the head of the transport apparatus according to the present invention is rotated.

The transport apparatus of the present invention is capable of performing the following operations:

1. As shown in FIG. 9, the table 3 can reciprocate along the rail 1.
2. As shown in FIG. 10, the arm 30 can ascend and descend.
3. As shown in FIG. 11, the column 10 is capable of making normal and reverse rotation around the vertical center axis thereof.
4. As shown in FIG. 13, the arm 30 can reciprocate to the right and left with respect to the column 10.
5. As shown in FIG. 14, the head 37 can swivel in the directions of the arrows S-S.
6. As shown in FIG. 8A, the jig mounting stage 45 is capable of horizontally making normal and reverse rotation (in the directions of the arrows e and f.

(Use of the Apparatus as a Transport Apparatus)

Figure 12:
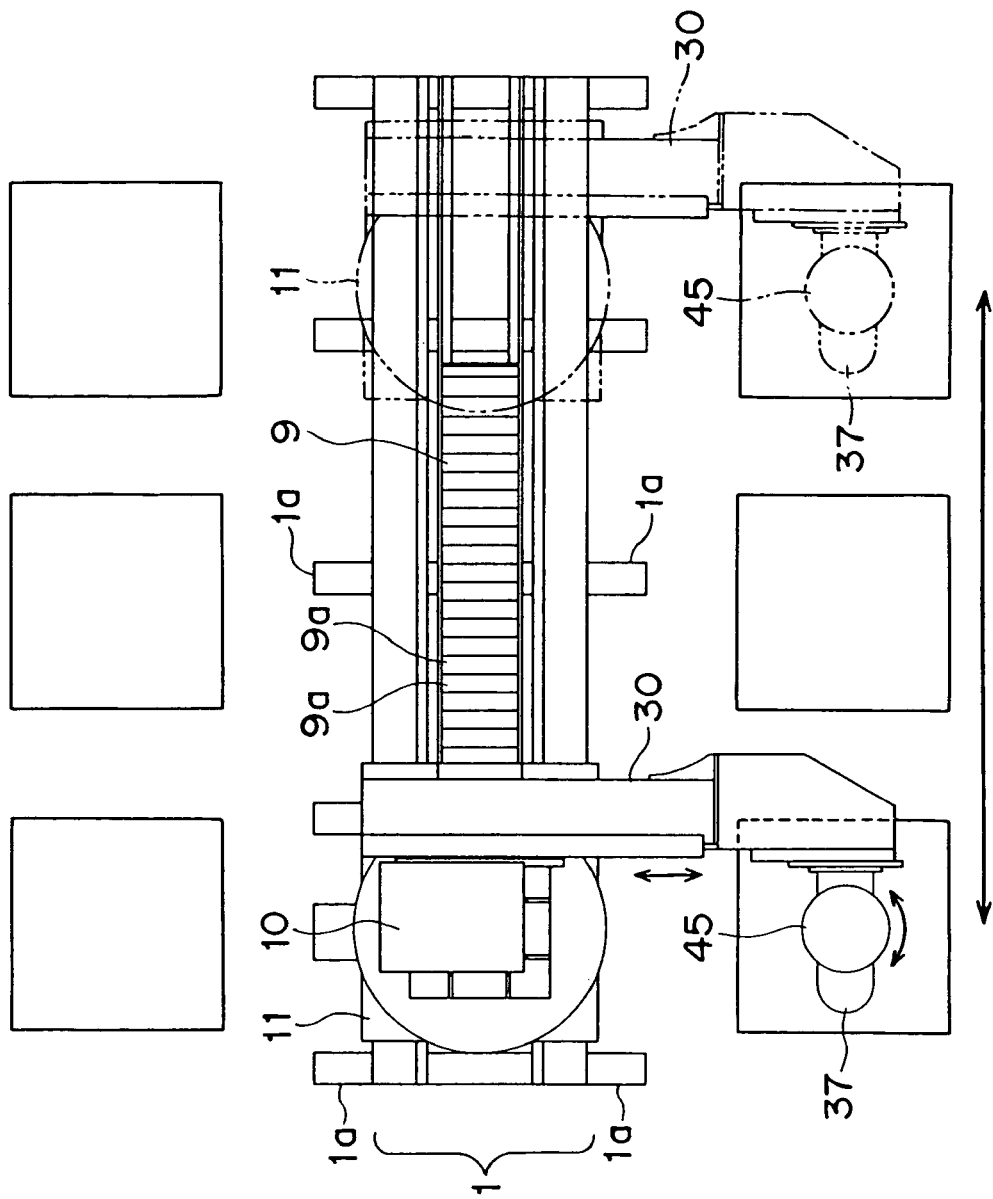
FIG. 12 is an explanatory view illustrating how the transport apparatus according to the present invention conducts an operation.
Figure 15:
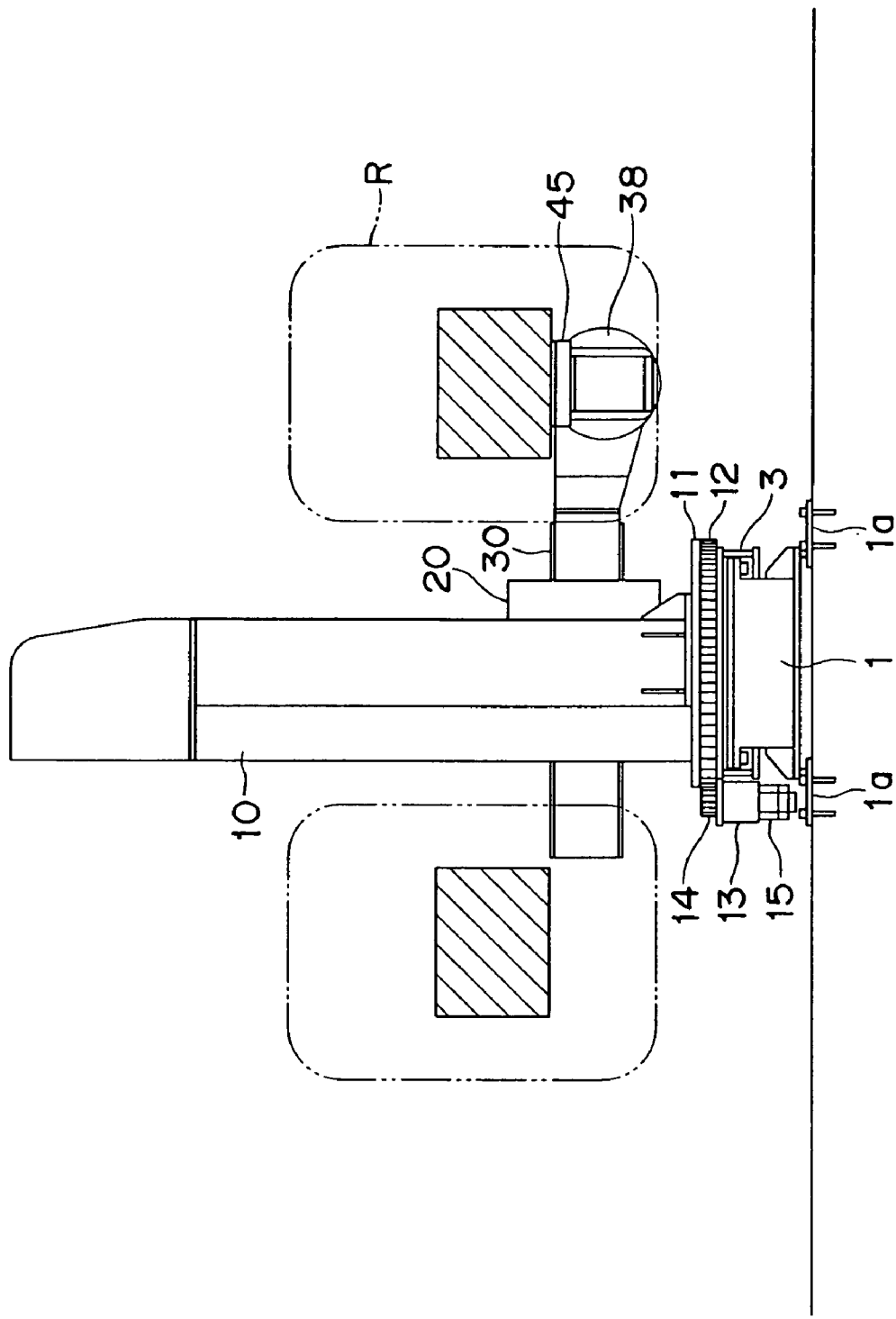
FIG. 15 is an explanatory side view illustrating how the transport apparatus according to the present invention conducts an operation.
Figure 16:
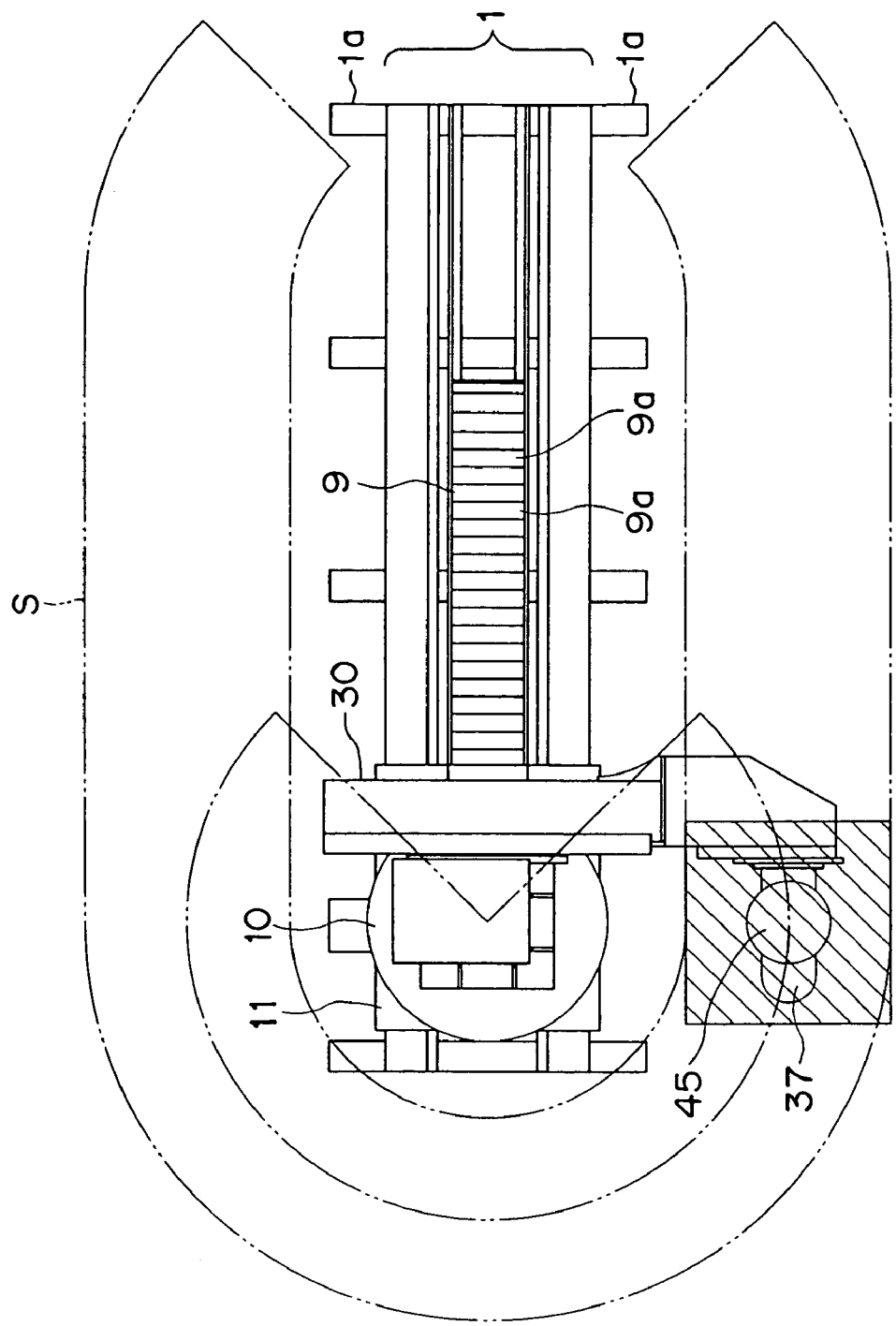
FIG. 16 is an explanatory plan view illustrating how the transport apparatus according to the present invention conducts an operation.

The transport apparatus of the present invention, which operates as described above, can make movements in conformity with various uses. In this case, the jig mounted to the jig mounting stage 45 is selected according to the use. For example, when the apparatus is to be used as a transport apparatus for transporting an article, a robot hand (a grasping device) capable of grasping an article is mounted to the jig mounting stage 45, and when an article is grasped by the robot hand and, in this state, the table 3 is moved along the rail 1, as shown in FIG. 9, it is possible to move the grasped article in the same direction or the reverse direction. When, as shown in FIG. 10, the arm 30 is raised with an article grasped, the article grasped by the robot hand can be moved from a lower to a higher position, and, conversely, when the arm 30 is lowered, the article can be moved from a higher to a lower position. As shown in FIG. 11, by rotating the column 10 by 180 degrees, it is possible to move an article which has been by the side of the column to the opposite side. Also, by laterally moving the arm 30 to the right and left or moving the table 3, it is possible to transport an article. When, as shown in FIG. 12, the arm 30 is moved to the right or left, it is possible to transport (move) to the right or left an article grasped by the robot hand. As shown in FIG. 13, by horizontally rotating the jig mounting stage 45, it is possible to change the position of an article, grasped by the robot hand mounted to the jig mounting stage 45, to a desired circumferential position. When, as shown in FIG. 1, the head 37 is rotated up and down, it is possible to grasp an object below by the robot hand and direct it upwards, grasp an object above by the robot hand and direct it downwards, or stop an object halfway through a vertical movement (e.g., at an angle of 90 degrees) and direct it sideways. In these cases, the article grasped by the robot hand can make six-axis motions, so that the movable range for the article can be expanded, making it possible, as shown in FIG. 12, to provide article extracting stations and article transfer stations at several positions. If there is a difference in height between the article extracting and transfer stations, the extraction and transfer of the articles can be easily performed. Further, the transport route can be easily selected or changed; even if there is an obstacle in the route, it is possible to transport an article while avoiding the obstacle. The imaginary line R in FIG. 15 indicates a plan view of the operation area for the jig mounting stage 45 when the arm 30 is raised, lowered, or moved to the right and left; and the imaginary line S in FIG. 16 indicates a plan view of the operation area for the jig mounting stage 45 when the arm 30 is moved laterally, the column 10 is rotated, or the column 10 is moved along the rail 1. In FIGS. 15 and 16, the shaded portions indicate workpieces.

(Use of the Apparatus as a Positioner)

Figure 17:
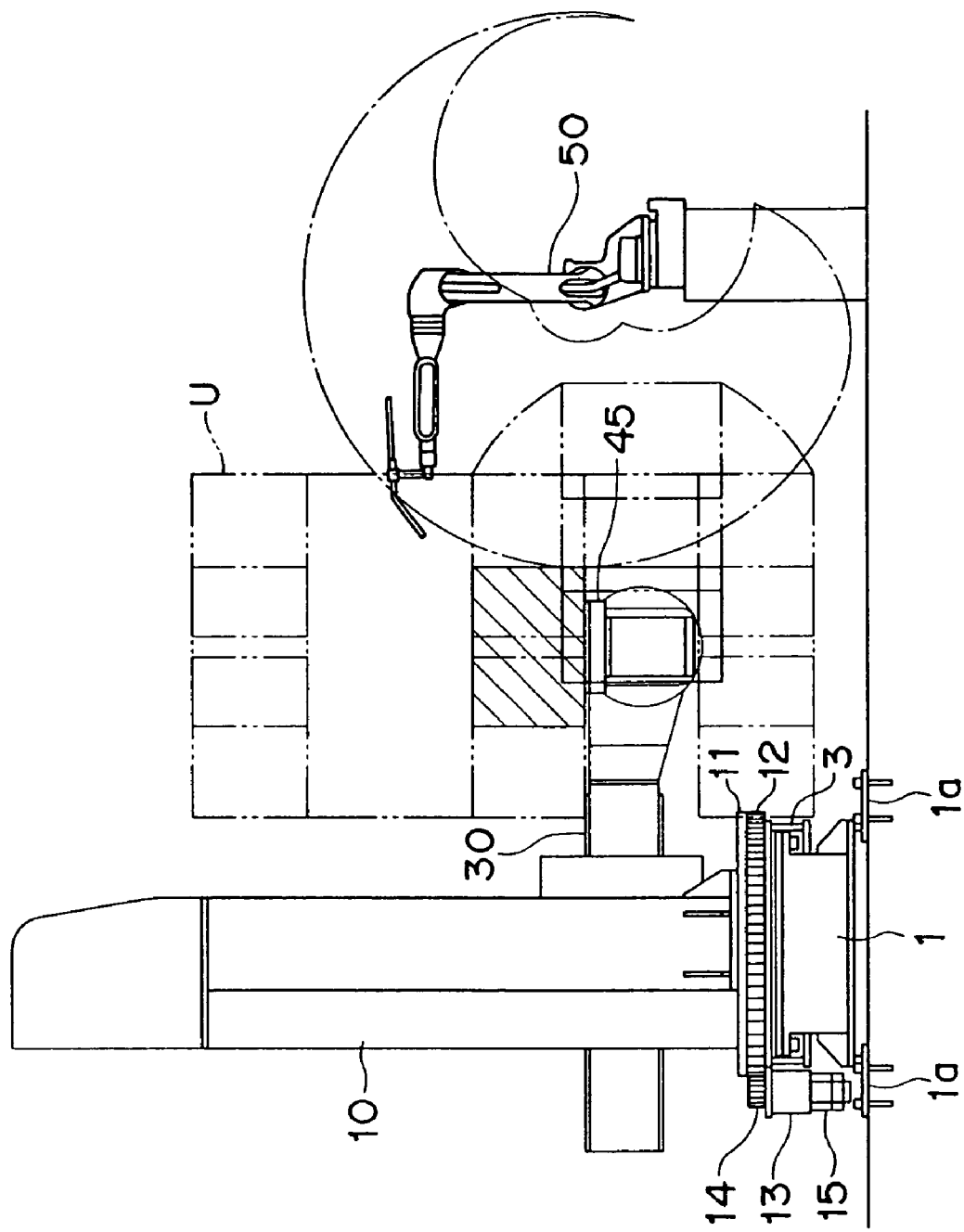
FIG. 17 is an explanatory side view illustrating how the transport apparatus according to the present invention conducts an operation when used as a positioner.
Figure 18:
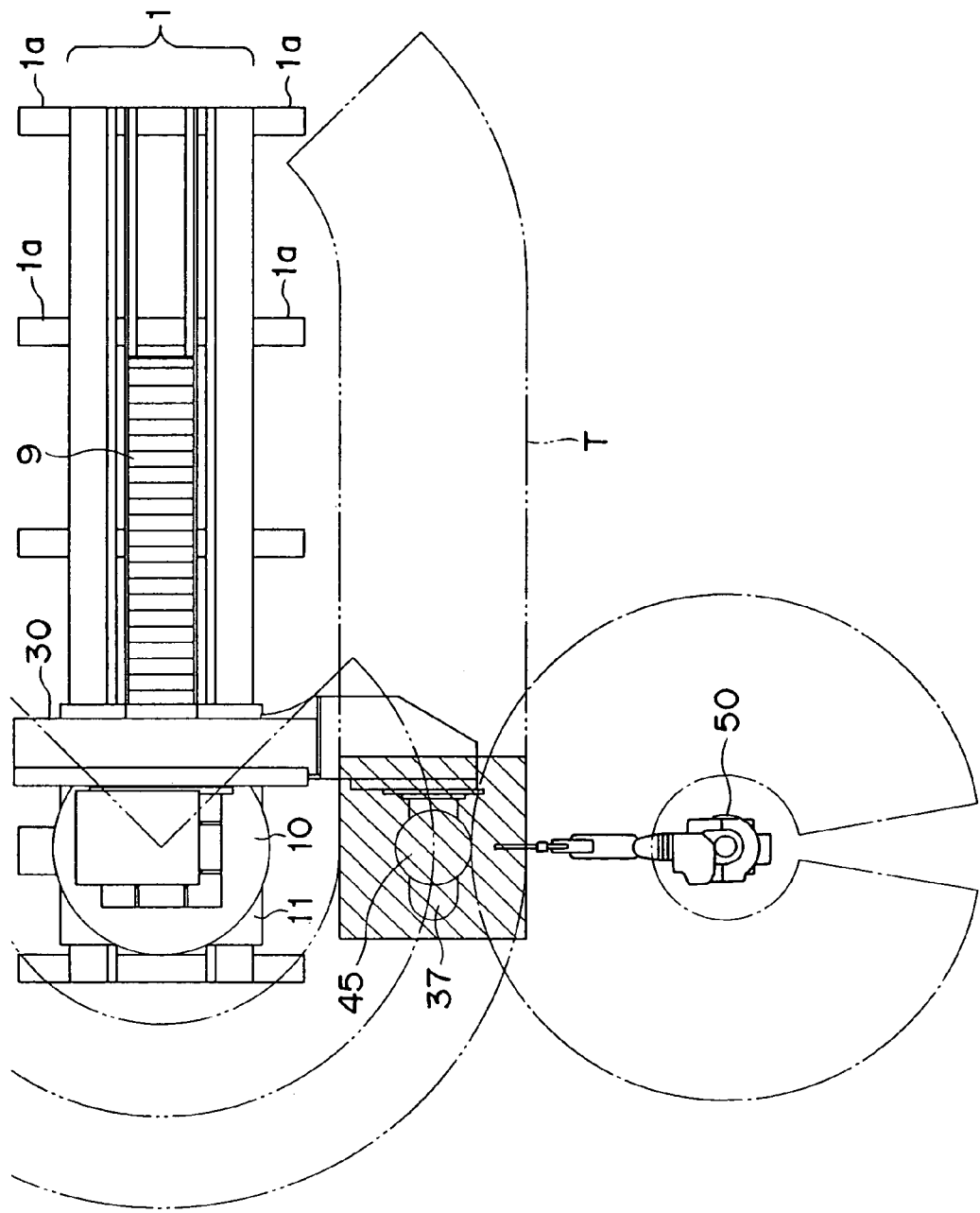
FIG. 18 is an explanatory plan view illustrating how the transport apparatus according to the present invention conducts an operation when used as a positioner.

When the transport apparatus of the present invention is to be used as a positioner, a robot hand (a grasping device) capable of grasping an article is mounted to the jig mounting stage 45, and, as in the case of transporting an article, an article is grasped by the robot hand, and the table 3 is moved along the rail 1, the column 10 is rotated, the arm 30 is raised, lowered, or moved laterally, the head 37 is rotated, and/or the jig mounting stage 45 is rotated, wherein these movements are stopped at desired positions, whereby the grasped article can be set at a desired position. In this case, as shown in FIGS. 17 and 18, it is possible to install a robot 50 for welding, coating, etc. by the side of the transport apparatus of the present invention, and to set a workpiece to be subjected to welding, coating, etc., constituting the article to be transported by the transport apparatus of the present invention, in position for the operation by the robot 50. The imaginary line U in FIG. 17 indicates a side view of the operation area for the jig mounting stage 45 when the arm 30 is raised, lowered, and laterally moved, and the imaginary line T in FIG. 18 indicates a plan view of the operation area for the jig mounting stage 45 when the arm 30 is moved to the right and left, the column 10 is rotated, and the column 10 is moved along the rail 1. In FIGS. 17 and 18, the shaded portions indicate workpieces.

(Use of the Apparatus as a Robot Carrying Apparatus)

Figure 19:
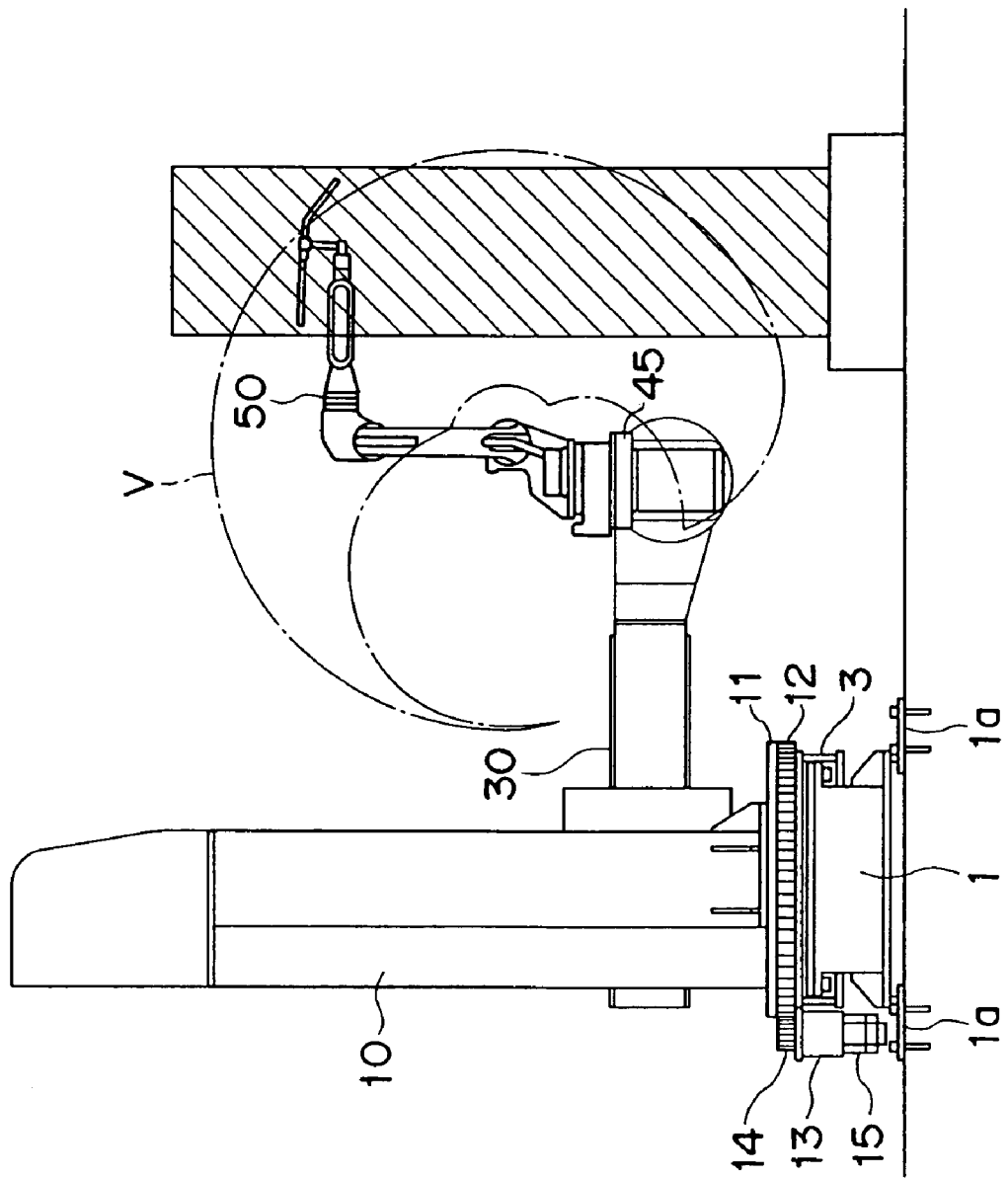
FIG. 19 is an explanatory side view illustrating how the transport apparatus according to the present invention conducts an operation when used as a robot carrying apparatus.
Figure 20:
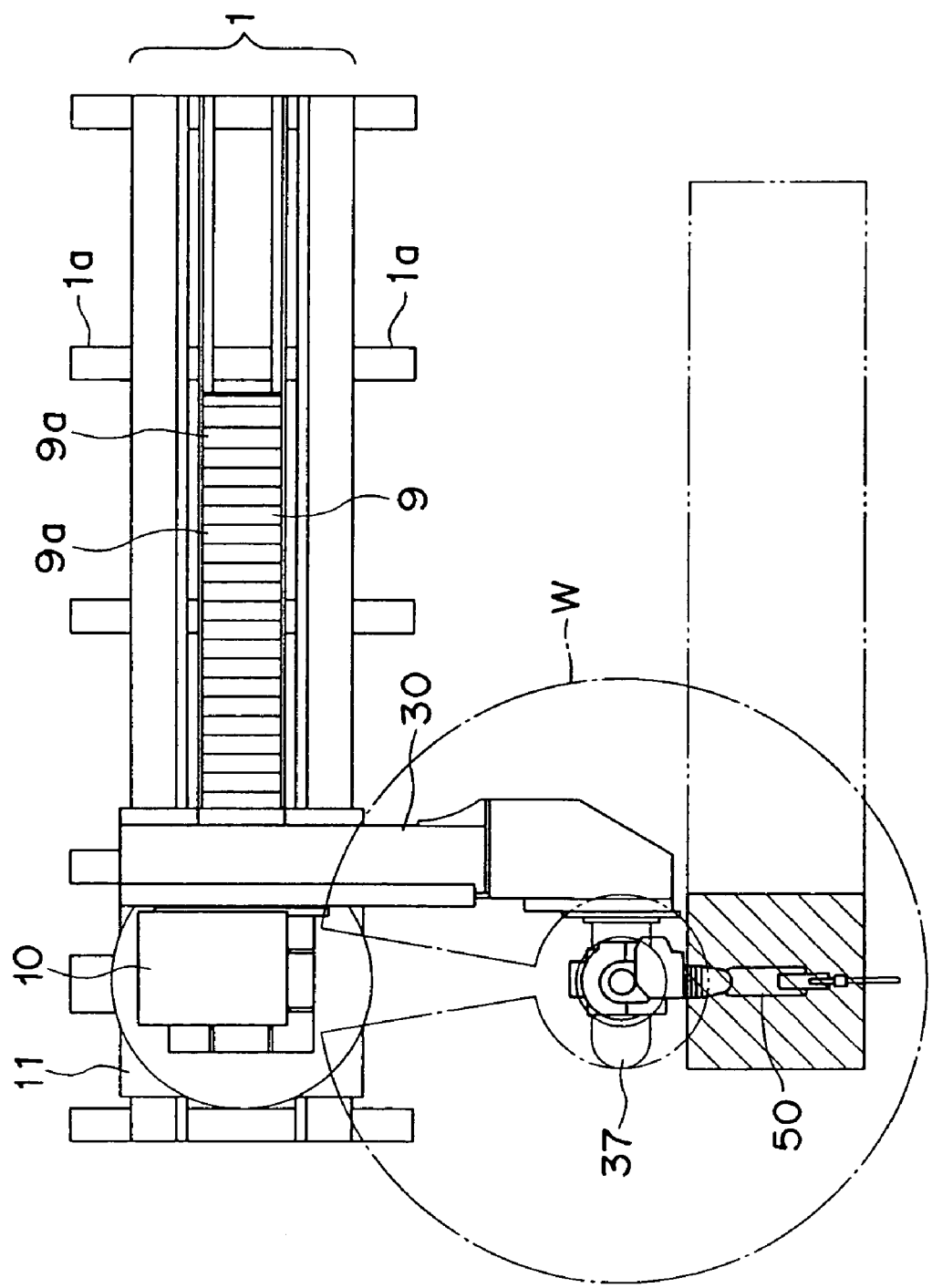
FIG. 20 is an explanatory plan view illustrating how the transport apparatus according to the present invention conducts an operation when used as a robot carrying apparatus.

When the transport apparatus of the present invention is to be used as a robot carrying apparatus to which a welding robot, a coating robot, or the like is mounted, as shown in FIGS. 19 and 20, a robot 50 for welding, coating, etc. is mounted on the jig mounting stage 45 of the transport apparatus and, in this state, the table 3 is moved along the rail 1, the column 10 is rotated, the arm 30 is raised, lowered, or moved to the right and left, the head 37 is rotated, and/or the jig mounting stage 45 is rotated, wherein these movements are stopped at desired positions, whereby it is possible to set the torch tip of the robot 50, the ejection nozzle of the coating robot, etc. in position with respect to the position of the workpiece to be subjected to welding, coating, etc. In this case, the operation of the robot itself can be combined with the six-axis operation of the transport apparatus of the present invention, so that the operating direction and the operation range (area) are markedly enlarged as compared with the case in which the robot is used alone. In FIG. 19, the line V indicates a side view of the arm operation area for the arm when the robot 50 is fixedly installed, and the imaginary line W in FIG. 20 indicates a plan view of the operation area for the robot 50 when the jig mounting stage 45 is fixed. In FIGS. 19 and 20, the shaded portions indicate workpieces.

Figure 21:
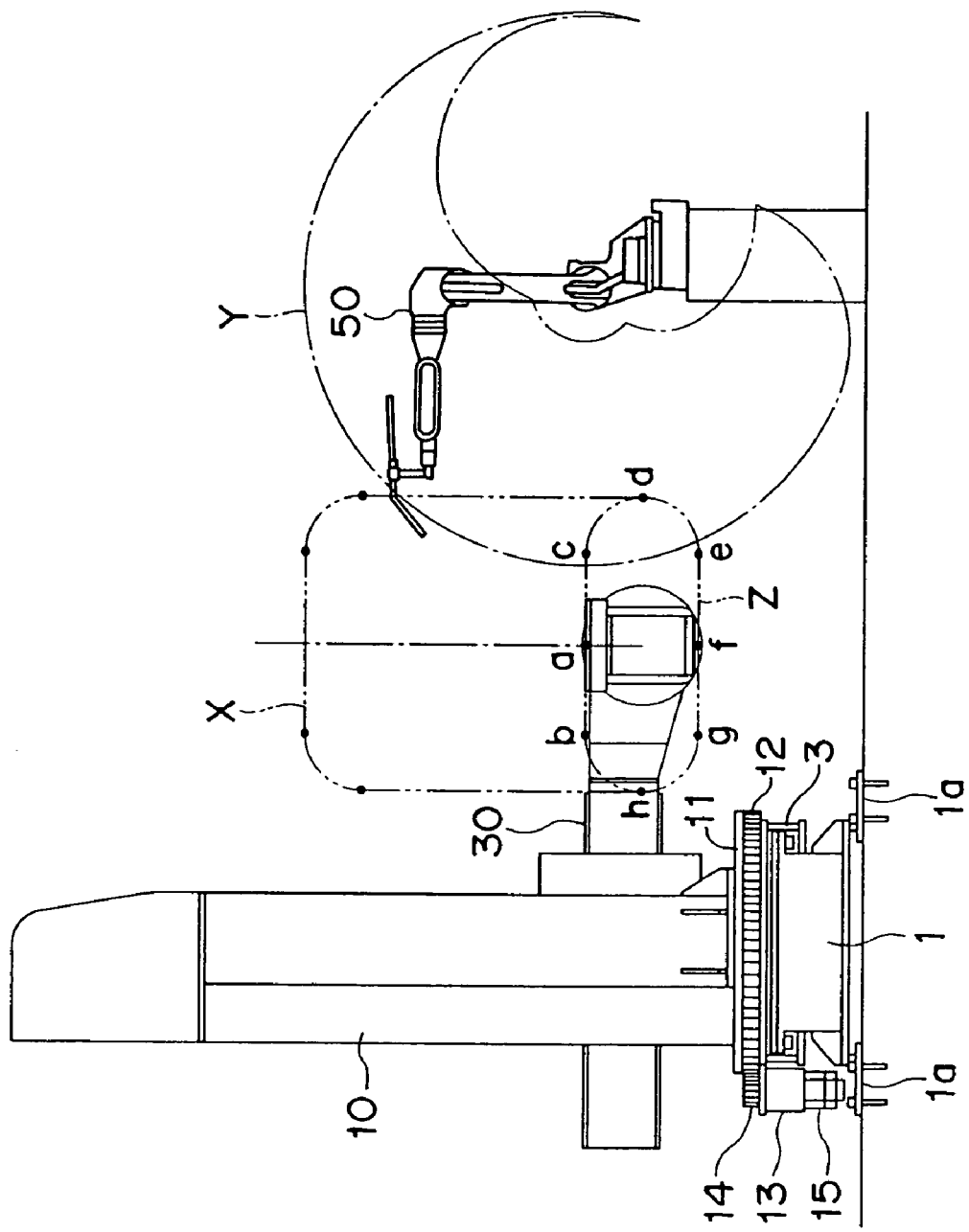
FIG. 21 is an explanatory plan view illustrating how the transport apparatus according to the present invention conducts another operation when used as a robot carrying apparatus.

In FIG. 21, the vertically elongated rectangular imaginary line X indicates a side view of the movable area for a point "a" when the arm 30 is raised, and the horizontally elongated elliptical imaginary line Z indicates a side view of the operation area when the arm 30 is moved solely forwards and backwards. In FIG. 21, the point a is the position when the jig mounting stage 45 is directed upwards, the point c is the position of the jig mounting stage 45 when the arm 30 is moved to the right, the point d is the position of the jig mounting stage 45 when the head 37 is rotated by 90 degrees (directed sidewise to the right) at the point c, the point e is the position of the jig mounting stage 45 when the head 37 is further rotated by 90 degrees (directed downwards) from the point d, and the point f is the position of the jig mounting stage 45 when the arm 30 is moved to the left from the point e. The point b is the position of the jig mounting stage 45 when the arm 30 is moved to the left from the point a, the point h is the position of the jig mounting stage 45 when the head 37 is rotated to the left by 90 degrees (directed sidewise to the left) at the point b, and the point g is the position of the jig mounting stage 45 when the head 37 is further rotated to the left by 90 degrees (directed downwards) at the position of the point h.

The table 3, the column 10, the arm 30, the head 37, and the jig mounting stage 45 may be operated automatically according to a previously incorporated program, or operated manually through remote control, or operated through remote control by manual operation of a control panel.

The transport apparatus of the present invention provides the following advantages:

(1) The table can reciprocate along the rail, the column can make normal and reverse rotation on the table, the arm can ascend and descend along the column and laterally reciprocate so as to cross the column, the head can make normal and reverse rotation around the axis thereof, and the jig mounting stage can make normal and reverse rotation around the axis thereof, so that six-axis movement is possible, whereby it is possible to grasp an article by a robot hand mounted to the jig mounting stage, and to transport it in a desired one of the six-axis directions.

(2) The six-axis movement can be stopped at a desired position, so that it is possible to set the article held by the robot hand at a desired six-axis position, which makes it possible to effect high accuracy positioning in accordance with the operating position for various types of robot, such as a welding robot or a coating robot, separately installed by the side of the transport apparatus of the present invention.

(3) The six-axis movement is a linear lateral reciprocating movement, a linear vertical reciprocating movement, or a normal/reverse rotation, and is no movement of articulated nature is involved. Further, the arm is not directly mounted to the reduction gear as in the conventional handling apparatuses, and the column, the head, and the jig mounting stage are driven through revolving wheel bearings by reduction gears, which leads to a construction superior in load capacity and capable of grasping and transporting an article as heavy as 1 ton or more and performing positioning thereon.

(4) The vertical axis of the column and the vertical axis of the head are arranged so as to be always situated in the same line parallel to the arm independently of the ascent/descent and lateral movement of the arm. Thus, even when grasping and transporting a heavy article weighing 1 ton or more by a robot hand mounted to the jig mounting stage, the column is not laterally tipped, so that stability is established.

(5) Since revolving wheel bearings are used for the rotation mechanisms of the column, the head, and the jig mounting stage, the rotation of the column, the head, and the jig mounting stage is easy and smooth, and normal and reverse rotation can be reliably effected even by motors of low horse power.

(6) By arranging the motor and the reduction gear so as to be offset sidewise and rearwards with respect to the revolving wheel bearing, the space for wiring, piping, etc. is secured, so that it is possible to arrange a large number of electric cords or hoses at the rear of the revolving wheel bearing. In particular, it is also possible to mount a Center Hole Joint (the trade name for a wiring/piping jig by the present applicant) that is a combination of a hydraulic rotary joint and a slip ring.

(7) The rail is formed in modules allowing extension or shortening of the rail through addition or removal of modules to thereby expand or reduce the operation range, so that it is possible to set the operation range according to the place of operation.

(8) It is possible to mount various types of robot, such as a welding robot or a coating robot, on the mounting stage; when such a robot is mounted, there are added, in addition to the movements of the robot itself, six-axis movements of the transport apparatus of the present invention, so that the movement range for the robot mounted is expanded, and the operation range is markedly widened.

What is claimed is:

1. A transport apparatus capable of grasping and carrying an article, transporting the article, performing positioning on the article, mounting a robot, and performing positioning on the robot, the transport apparatus comprising:
    a table provided on a lateral rail, the table being capable of making a lateral reciprocating movement along the rail,
    a vertical column provided on the table, the column being capable of normal and reverse rotation around a vertical axis on the table;
    a lateral arm having a first tip and a second tip, the first tip of the lateral arm being mounted to the vertical column and protruding sidewise therefrom, the arm being capable of ascending and descending along the column and making a lateral reciprocating movement;
    a head mounted to the second tip of the lateral arm, the head protruding in a direction parallel to the column therefrom;
    a jig mounting stage laterally mounted to the head, and the jig mounting stage mounted in a direction that crosses the protruding axis of the head; and
    a vertical axis of the column and a vertical axis of the jig mounting stage being arranged in a same line that is parallel to a lateral axis of the arm;
    the table being capable of making a reciprocating movement along the lateral rail through a table movement mechanism and a table movement mechanism drive source for driving the table movement mechanism;
    the column being capable of making normal and reverse rotation on the table through a column rotation mechanism and a column rotation mechanism drive source for driving the column rotation mechanism;
    the arm being capable of ascending and descending along the column through an ascent/descent mechanism and an ascent/descent mechanism drive source for driving the ascent/descent mechanism;
    the lateral arm being capable of making a lateral reciprocating movement along the column through a lateral movement mechanism and a lateral movement mechanism drive source for driving the lateral movement mechanism; and
    the reciprocating movement of the table, the normal and reverse rotation of the column, and the ascending and descending and the lateral reciprocating movement of the arm being capable of stopping at desired positions.

2. The transport apparatus according to claim 1, wherein the head mounted to the arm and protruding in the direction of the column therefrom is capable of making normal and reverse rotation around an axis thereof,
    the jig mounting stage being capable of making a rotation around the axis thereof;
    the head being capable of making normal and reverse rotation around the axis thereof through a head rotation mechanism and a head rotation mechanism drive source for driving the head rotation mechanism; and
    the jig mounting stage being capable of making normal and reverse rotation around the axis thereof through a jig mounting stage rotation mechanism and a jig mounting stage rotation mechanism drive source for driving the jig mounting stage rotation mechanism.

3. The transport apparatus according to claim 1, wherein a grasping device is mounted to the head or the jig mounting stage.

4. The transport apparatus according to claim 2, wherein a grasping device is mounted to the head or the jig mounting stage.

5. The transport apparatus according to claim 1, wherein the head rotation mechanism drive source and the jig mounting stage rotation mechanism drive source is arranged while being offset sidewise with respect to revolving wheel bearings, securing a space that can be used for wiring or piping.

6. The transport apparatus according to claim 2, wherein the head rotation mechanism drive source and the jig mounting stage rotation mechanism drive source is arranged while being offset sidewise with respect to revolving wheel bearings, securing a space that can be used for wiring or piping.

7. The transport apparatus according to claim 3, wherein the head rotation mechanism drive source and the jig mounting stage rotation mechanism drive source is arranged while being offset sidewise with respect to revolving wheel bearings, securing a space that can be used for wiring or piping.

8. The transport apparatus according to claim 1, wherein the column is capable of making a rotation from one side of the lateral line to the other side thereof, and the arm makes a rotation with the rotation of the column.

9. The transport apparatus according to claim 2, wherein the column is capable of making a rotation from one side of the lateral line to the other side thereof, and the arm makes a rotation with the rotation of the column.

10. The transport apparatus according to claim 3, wherein the column is capable of making a rotation from one side of the lateral line to the other side thereof, and the arm makes a rotation with the rotation of the column.

11. The transport apparatus according to claim 4, wherein the column is capable of making a rotation from one side of the lateral line to the other side thereof, and the arm makes a rotation with the rotation of the column.

* * * * *